United States Patent [19]

Davies

[11] Patent Number: 4,678,994

[45] Date of Patent: Jul. 7, 1987

[54] METHODS AND APPARATUS EMPLOYING APPARENT RESONANT PROPERTIES OF THIN CONDUCTING MATERIALS

[75] Inventor: Ronald C. Davies, Cwmbran, United Kingdom

[73] Assignee: Digital Products Corporation, Fort Lauderdale, Fla.

[21] Appl. No.: 625,081

[22] Filed: Jun. 27, 1984

[51] Int. Cl.⁴ .................... G01N 27/72; G01R 33/12
[52] U.S. Cl. .................... 324/236; 324/226; 324/227; 324/207; 194/317; 331/117 R
[58] Field of Search ............ 324/207, 208, 233, 234, 324/235, 236, 326, 327, 225-228; 194/100 A, 317-319; 331/64, 65, 67, 117 R; 336/84 C, 200, 232

[56] References Cited

U.S. PATENT DOCUMENTS

| | | |
|---|---|---|
| 1,815,717 | 7/1931 | Kranz . |
| 2,769,734 | 9/1956 | Yates . |
| 2,843,829 | 7/1958 | Slate . |
| 2,921,280 | 1/1960 | Litwin et al. . |
| 3,422,415 | 1/1969 | Ichimori . |
| 3,473,111 | 10/1969 | Leersnijder et al. . |
| 3,555,326 | 1/1971 | Talebi et al. . |
| 3,557,321 | 1/1971 | Takao . |
| 3,619,805 | 11/1971 | Bean . |
| 3,688,187 | 8/1972 | Loos .................................. 324/224 |
| 3,691,524 | 9/1972 | Frost et al. . |
| 3,743,853 | 7/1973 | Dittmann et al. . |
| 3,825,818 | 7/1974 | Mayberry .......................... 324/260 |
| 3,901,368 | 8/1975 | Klinger ............................ 73/163 X |
| 3,906,340 | 9/1975 | Wingfield et al. ................ 331/65 X |
| 4,112,393 | 9/1978 | Waldorf et al. ............. 331/117 R X |
| 4,114,428 | 9/1978 | Popenoe ........................... 331/65 X |
| 4,164,706 | 8/1979 | Akita et al. ........................ 324/208 |
| 4,184,366 | 1/1980 | Butler ................................... 73/163 |
| 4,446,427 | 5/1984 | Louvenich ....................... 331/65 X |
| 4,503,922 | 3/1985 | Brosh et al. .................... 324/207 X |
| 4,536,719 | 8/1985 | Baum et al. ..................... 331/65 X |

FOREIGN PATENT DOCUMENTS

| | | |
|---|---|---|
| 2739967 | 9/1977 | Fed. Rep. of Germany . |
| 2829880 | 7/1978 | Fed. Rep. of Germany . |
| 2126347 | 3/1984 | United Kingdom .............. 324/207 |

Primary Examiner—Reinhard I. Eizensopf
Assistant Examiner—Warren S. Edmonds
Attorney, Agent, or Firm—Lerner, David, Littenberg, Krumholz & Mentlik

[57] ABSTRACT

Methods and apparatus for sensing, switching and modulating relying upon apparent resonant properties of thin conductive materials are provided in accordance with the teachings of the present invention. According to the present invention, an output of an oscillating circuit is selectively varied as a function of the relationship between a coil within the oscillating circuit, a thin conductive member and the apparent resonant condition of the thin conductive member to achieve appropriate sensing, switching and modulating conditions.

62 Claims, 14 Drawing Figures

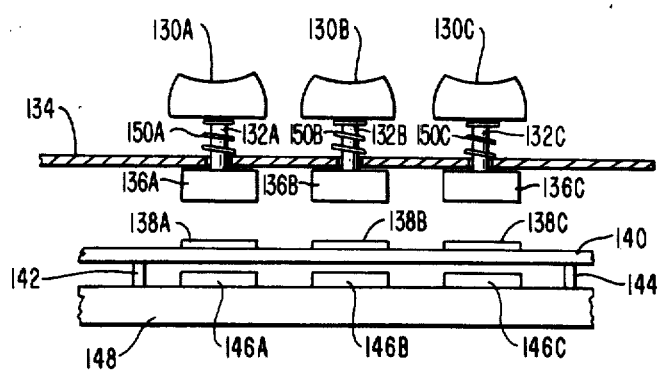
F I G. 10
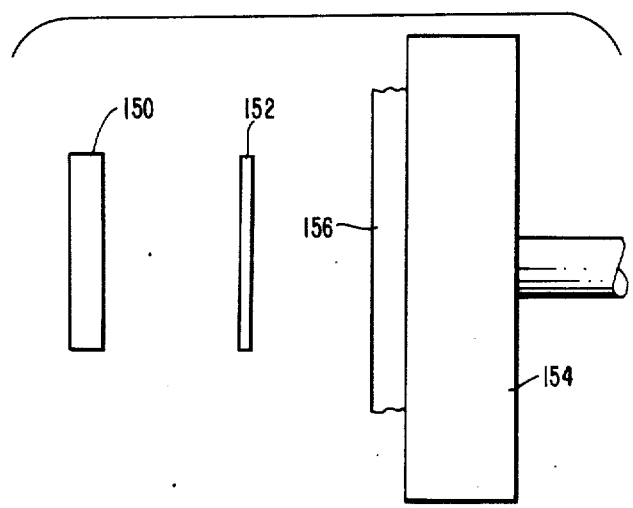
F I G. 11

METHODS AND APPARATUS EMPLOYING APPARENT RESONANT PROPERTIES OF THIN CONDUCTING MATERIALS

FIELD OF THE INVENTION

This invention relates to methods and apparatus employing newly discovered resonant properties of thin conducting materials, and more particularly, to techniques for employing such resonant properties to achieve self-calibrating, contactless sensors, switches and modulators.

BACKGROUND OF THE INVENTION

The effects of placing non-magnetic, electrically conductive objects in the alternating magnetic fields of coils have been the subject of much study and are generally viewed as predictable and understood. In this vein, the magnetic coupling which provides the basis for mutual inductance has long been employed to achieve energy transfer, impedance matching and loading. In addition, these same effects provide the basis of development for more esoteric devices such as proximity sensors, contactless thickness measuring devices, position detecting systems, accelerometers, electronic tachometers and monitoring devices of various kinds.

Typically, when a non-magnetic, electrically conductive object is placed in the alternating magnetic field of a coil, the effective inductance of the coil is decreased and its effective resistance is increased. This occurs because whenever the magnetic flux in a medium is changing, an electric field appears within the medium as a result of time variation of the flux. When the medium is conductive, circulating currents tending to oppose the field or the externally applied magnetomotive force are created. These currents are called eddy currents and their presence results in an energy loss in the material proportional to the energy being absorbed from the circuit that sets up the field and being dissipated as heat in the medium. The effect of such currents is to screen or shield the material from the flux and to bring about a smaller flux density nearer the center of the object than at the surface. Thus, for a specific total flux varying periodically, the maximum flux density at the center is smaller than what would be obtained from dividing the total maximum flux by the area. In effect, the total flux tends to be crowded toward the surface of the object to create an effect known as skin effect, which is quite similar to the skin effect phenomena which occurs in an electric conductor having a varying current applied thereto. Thus, in such a conductor, the electric current density is greatest at the surface.

Moving the object closer to the coil increases the effect. Thus, coil characteristics are a function of the spacing between the coil and the object and the eddy current effect has been relied upon, to a great extent, in the development of proximity sensors, contactless tachometers, thickness measuring devices, position detecting systems, accelerometers and monitoring devices of various types.

For instance, utilization of the eddy current effect has been employed in many forms of sensors relied upon to determine the position of a specific object or target, as in the case of proximity sensors. In such systems, an electronic circuit is employed to generate an analog signal related to a target's position. In some systems, the sensing coil is made part of an impedance bridge circuit so that the changes in coil inductance and impedance produce error signals related to target position. In other systems, the coil is part of an oscillator circuit so that the target's movements produce frequency changes. The frequency of excitation of the coil is frequently 1 MHz or more, and at these frequencies eddy currents are generally confined near the surface of the target due to the skin effect. For example, the skin effect depth in aluminum at 1 MHz is 0.0033 inch. While targets for such detectors may be very thin and light-weight, thicknesses which produce maximum eddy currents at individual operating frequencies are obviously selected. In such systems where sensing occurs as a function of the output of the driving oscillator circuit, a sensing condition invariably results in a frequency shift at the oscillator since the resulting eddy currents induced in the target which create the sensed condition work a change in the effective inductance of the coil, and hence, a resulting frequency change in the oscillator circuit in a driving relationship therewith.

Another form of proximity transducer could be devised using the principles of mutual resonance. For example, a sensing coil which forms part of an oscillating circuit could use as its target a passive resonant circuit tuned to the same frequency as that of the oscillator. The passive resonant circuit would absorb energy from the oscillator coil in proportion to its proximity. Under these conditions, a sensed condition would be characterized by a reduction in amplitude in the output of the driving oscillator rather than the frequency changes which attended the creation of substantial eddy currents and the attendant inductance change in the coil. Here the passive resonant circuit is effectively stealing energy from the driving circuit rather than working a change of impedance in the linking coil. If the passive resonant circuit is positioned closely to the sensing coil, the oscillation of the driving circuit may cease entirely.

While use of a passive resonant circuit has the advantage that it offers far more sensitivity than eddy current systems, it has disadvantages. These disadvantages include a requirement that the target consist of a coil and capacitor combination which is cumbersome. In addition, the stability requirements for the oscillator frequency are stringent and the effects of the environment on the target can substantially impact its tuning, and hence, its response. For these reasons, eddy current systems today have found wider application than those associated with passive resonant circuits.

Another use of eddy current systems is in electronic coin detectors such as are disclosed in my U.S. Pat. Nos. 4,354,587 and 4,359,148. Here, the loss associated with a valid coin passing through a coil oscillating at a frequency within the RF range is relied upon to create a well-defined notch in the output of the oscillator as a coin traverses a coil. This notch is so well defined that other coins or slugs having differing physical characteristics can readily be distinguished and determined to be unacceptable when viewed from the standpoint of the creation of a smaller or greater notch than that associated with a valid coin. It was through experimentation with this form of coin acceptor that the instant phenomena was discovered.

More particularly, while conducting experiments to determine the susceptibility of such electronic coin detectors to slugging, a phenomena was noted which subsequently led to the discovery that thin layers of non-magnetic conductive material appear to act in the same manner as a passive resonant circuit.

In the experiments conducted, a version of a slug wherein a thin metallic layer was placed on a plastic washer was employed. In fact, the thin metallic layer was the paper-backed foil employed in packaging Marlboro cigarettes. This foil was effectively Scotch-taped to the plastic washer in such a manner that only a single layer was placed thereon. The effect of this form of slug was surprising and wholly unexplainable in that insertion of this slug created the largest loss in the output of the driving oscillator that had been experienced.

This large loss was produced by an extremely thin piece of aluminum foil which behaved completely differently from any of the metallic coins or metallic slugs undergoing test because until then the loss produced had been generally proportional to the mass of the coin or slug being tested. Another disparity was noted in that the output of the oscillator did not indicate the presence of an eddy current mechanism within coins or slugs being tested. More particularly, depending upon the mass and other characteristics of the coin or slug being tested, the output of the oscillator driving the coin detector normally acts as if one or more turns on the coil are shorted. The reduction in the output of the oscillator is attended by marked changes in frequency as the circuit is detuned. Here, however, not only was the attenuation in the output of the oscillator larger than anything previously experienced, but it was not attended by any shift in the frequency indicative of an increase in the resistance reflected at the coil. However, since the foil-clad slugs were not treated as authentic coins by the electronic coin detector, the results were not further investigated at this time, but instead, the effects observed were noted for further investigation at another time.

Further inquiry into the unusual phenomena noted during the slugging experiments confirmed the fact that extremely thin pieces of aluminum behaved completely different from any metallic coins tested within the coil of electronic coin detectors, and instead acted in the same manner as a passive resonant circuit which was self-calibrating with respect to frequency. It was also found that any non-magnetic conductive material such as sheet brass, aluminum, copper, gold, silver, zinc, or almost any other form of conductive material acted in a similar manner to remove energy from the coil associated with the tuned oscillator driving the electronic coin detector. The initial observation that this did not appear to be an eddy current effect has been confirmed by further experimentation.

The further experimentation conducted indicated that the effect noted and being analyzed was characterized by behavior corresponding to the effect of placing a passive resonant circuit close to the coil of an active resonant circuit where both circuits were tuned to essentially the same frequency. However, it was also noted that frequency dependence was not highly critical in that the thin foil under test would tend to calibrate itself to the frequency of the oscillator even under circumstances where the tuned frequency was deliberately and substantially shifted. Furthermore, it was found that the resonant characteristics of the thin film of material was distance dependent to a large degree and the same could be maximized by configuring the coil or the film to a shape enabling a uniform distance between all portions of the coil and the film to be achieved. This was done, as shall be seen below, by developing flat, helically disposed coils on printed circuit boards, or conversely, by configuring the film to conform to the cross-section of a coil by designing the same as a piston or the like. When this was done, the correspondence of the effect noted to that of a passive resonant circuit became manifest. The phenomena observed has been termed spontaneous resonance.

While the phenomena herein referred to as spontaneous resonance is not fully understood, experimentation has confirmed its existence in all forms of thin conductive media and a clear interrelationship between the thickness of the material employed and the frequency of the oscillator. This indicates clearly that the skin effect depth of the material is involved in that thicknesses for a film selected must be in the range of a fraction of its skin effect depth. To date, a full range of parameters in terms of frequency versus thickness are not available for a substantial number of materials since some difficulty has been experienced in obtaining thin layers of varying materials and varying thicknesses in the ranges involved. However, for a number of materials, frequencies and thicknesses, it has been confirmed that the effect termed spontaneous resonance does exhibit marked correspondence to that manifested by a passive resonant circuit tuned to the frequency of oscillation of the driving circuit. Furthermore, experimentation conducted to date indicates that for a given frequency, the effect of spontaneous resonance is only present for a predetermined range of thickness. If a layer of material exceeds this thickness range, the material acts inductive, producing eddy currents; while layers which are thinner than the range involved act capacitive. Thus, for a frequency of 6.9 MHz, a thin layer of aluminum begins to appear inductive at approximately 12 microns and capacitive at 1 micron.

When such thin layers are placed outside a certain range, no effect on the oscillator is noted. Within a predetermined range, the output of the oscillator is reduced in what appears to be an increasing fashion as the film is brought closer to the coil associated with the tuned driving circuit. Within a certain distance the presence of the thin layer will completely shut down the oscillator. Furthermore, experimentation has confirmed that this effect is only present when the oscillator coil effectively sees a thin layer, and hence, presence of a thicker metallic layer, such as a coin, in the vicinity of the film will completely destroy the spontaneous resonance exhibited thereby. These outstanding and wholly unexpected characteristics associated with the phenomena has enabled self-calibrating, contactless sensors, switches and modulators to be developed in accordance with the teachings of the instant invention.

Therefore, it is a principal object of the present invention to provide self-calibrating, contactless sensors, switches and modulators employing the apparent resonant properties of thin, non-magnetic conductive materials.

SUMMARY OF THE INVENTION

In accordance with the teachings of the present invention, methods and apparatus for sensing, switching and modulating employing apparent resonant properties of thin conductive materials are provided wherein an output of an oscillating circuit is selectively varied as a function of the relationship between a coil within said oscillating circuit, a thin conductive member, and the apparent resonant condition of said thin conductive member.

BRIEF DESCRIPTION OF THE DRAWINGS

The invention will be more clearly understood by reference to the following detailed description of an exemplary embodiment thereof in conjunction with the accompanying drawings in which:

FIG. 10 is a block diagram serving to schematically illustrate another switch embodiment of the present invention configured as a keyboard or pad array; and FIG. 11 is a block diagram serving to schematically illustrate an additional sensor embodiment of the present invention configured as a thickness measuring device.

DETAILED DESCRIPTION OF THE INVENTION

Figure 1:
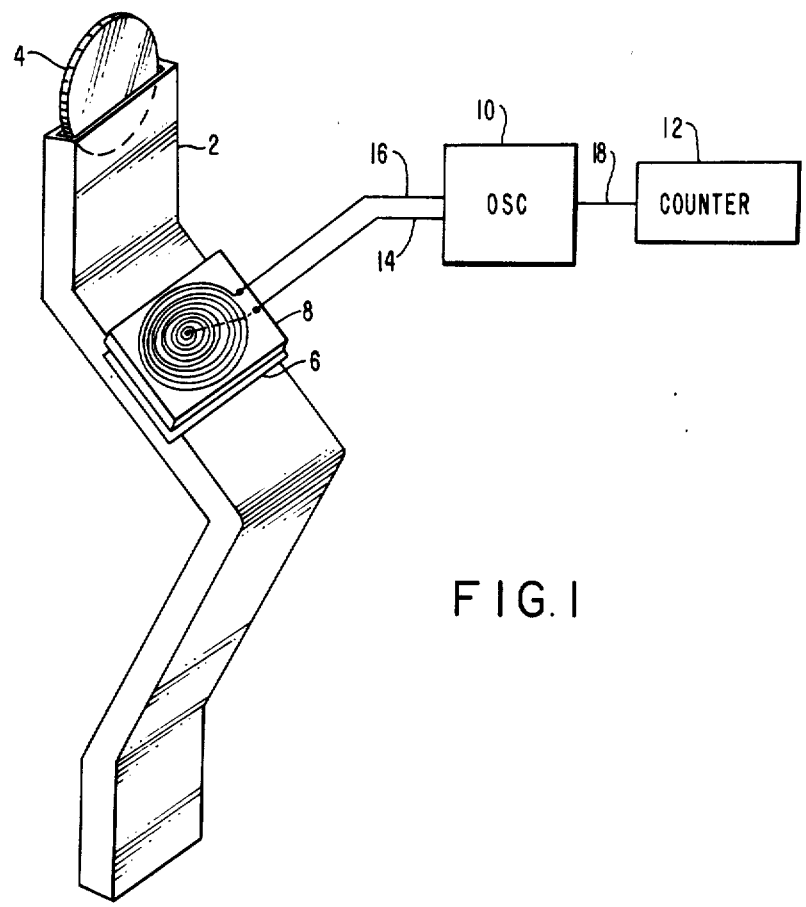
FIG. 1 is a block diagram serving to schematically illustrate a preferred switch embodiment according to the instant invention.

This invention proceeds from the discovery that thin layers of non-magnetic conductive material display what appears to be resonant properties when placed in a coupling relationship with a tuned circuit whose resonant frequency is in the RF range. Furthermore, the resulting phenomena is enhanced when the coil of the tuned oscillator driving circuit is configured to be equally distant from all points on the surface of the thin layer of conductive material. Hence, when a flat layer of conductive material is employed, the coil may be configured as a flat coil on a printed circuit board. Conversely, when normal helically wound coils are uitlized, the thin layer of conductive material should be circumferentially disposed thereabout. The available thickness of the thin layer of conductive material employed appears to vary with the frequency of the tuned circuit and the material employed. For example, for an oscillator having a resonant frequency of 1 MHz, a layer of aluminum having a thickness of 0.0005 inch is required, while for higher frequencies, thinner layers of material are appropriate.

With the phenomena of spontaneous resonance suitably enhanced through the use of an oscillating circuit employing an appropriately configured coil and tuned to a particular frequency suitable for the thin layer of conductive material employed, it has been found that a typical thin layer of conducting material will begin to effect the magnitude of oscillations of a driving oscillator when the same is disposed approximately ¼ inch from the planar face of a printed circuit coil employed in the oscillator. This effect will increase as the thin layer of conductive material is brought closer to the face of the coil. Once the thin layer of conductive material is approximately ⅛ inch from the planar face of the coil, the spontaneous resonant effect imposed by the thin layer of conductive material is so substantial that all energy is effectively removed from the oscillator and the oscillator is shut down.

It has also been found that the effect of the thin conductive layer in a range from approximately ¼ inch from the face of a planar coil to ⅛ inch therefrom appears to be such that a substantially increasing relationship is obtained between the distance from the coil and the magnitude of the oscillations from the oscillator. Thus, when the conductive layer is ⅛ inch from the face of the coil, a zero output from the oscillator is obtained, while when the thin conductive layer is ¼ inch from the face of the coil, an output voltage having a magnitude essentially corresponding to the plate voltage of the oscillator is obtained. In addition, within this range the degradation in the output of the oscillator occurs only with respect to the magnitude of the oscillations and there is very little attendant frequency shift, indicating that no substantial eddy current phenomena is operative.

The approximate ⅛ inch range associated with the position of the thin conductive layer can be extended by varying the form of the oscillator employed such that where only on/off or digital effects are desired, one form of oscillator is selected, whereas when an analog form of output is desired, another form of oscillator providing a greater range may be employed. Variations are also available as a function of frequency, material and technique utilized.

Analysis of the phenomena where the same is provided with maximum effect in the manner set forth above has also indicated that the effect of spontaneous resonance exhibited by a thin conducting layer may be selctively destroyed. This is done when additional conductive material is placed in the vicinity of the thin conductive layer such that a coil of a driving oscillator then sees only conductive material having normal characteristics. This means that sensors, switches and the like relying upon the spontaneous resonance phenomena may be operated in two distinct modes, depending upon the application desired.

In the first mode, a resonant circuit may be employed to sense the proximity of a thin conductive layer and provide an output which varies, in what appears to be an exponential manner, from full magnitude oscillations when not experiencing the spontaneous resonance effect associated with the thin layer, to a zero output as the tin conductive layer is positioned closely to the coil of the oscillator. Conversely, a second mode of operation is available wherein the oscillator normally has a thin conductive layer placed proximate to its coil so that effectively no output is produced thereby. Thereafter, the presence of thicker layers of conductive materials may be sensed as said materials transit past the thin conductive layer. This occurs since the spontaneous resonance displayed by the thin conductive layer is destroyed and oscillations will break out in the oscillator during such intervals as conductive materials are physically adjacent to the thin conductive layer. This latter mode of operation is found to be highly desirable in applications such as coin detectors, microswitches and the like where effectively conductive metallic objects having a thickness substantially greater than the thin layer of conductive material are to be sensed. If a thicker layer is moved toward and away from the thin layer placed proximate to the coil, what appears to be a linear range of operation is available.

The theory underlying the phenomena herein referred to as spontaneous resonance is not presently understood. However, a possible explanation therefor is set forth to acquaint the reader with the inventor's views thereon. If a single wire conductor carrying an alternating current is considered, such a conductor will be surrounded by a similarly alternating magnetic field moving outward from the conductor at right angles thereto. This magnetic field will exist simultaneously with an electric field whose orientation will be parallel to the conductor and exhibit a potential of influence opposite to the moving electrons in the conductor.

If a thin sheet of aluminum is placed in close proximity to the conductor, eddy currents will be set up on that sheet creating energy losses in the conductor in accordance with Lenz's law, as given by the equation:

$$P_e = \frac{(\pi f t \, Bmax)^2}{6P \times 10^{16}} = \text{Watts per } CU\ CM$$

where
f = frequency, HZ
t = thickness, CM
Bmax = flux lines per CM$^2$
p = resistivity OHMS-CM From this equation, it will be noted that eddy currents are at a maximum where the flux lines are the most dense. In the case being considered, the flux lines are most dense in the immediate vicinity of the conductor. Therefore, although the whole sheet of metal is producing eddy currents to some degree, there does exist an area of higher electron activity in the immediate vicinity of the conductor. This area of high electron activity can be equated to an electric charge, it being reasonable to assume therefore that created in the sheet metal is a pattern of electric charges which form a crude, diffused mirror image of the physical shape of the conductor.

If a second conductor carrying the same currents in the same direction is now placed in close proximity and parallel to the first, electric charges created in the metal sheet would now tend to merge into one due to the high conductivity of the metal sheet in which they appear. In order for these electric charges to retain their individual identity electrons must be prevented, or at least restricted, from flowing along the longitudinal path between the two charges. This can be achieved by reducing the thickness of the metal sheet to effectively increase its cross-sectional resistivity, making it correspondingly more difficult for the charges to cancel. Thickness of required thin layers of conductive material to retain charge individually vary with frequency such that at a frequency of 1 MHz, for example, a thickness of 0.0005 inch is required for aluminum, while higher frequencies mandate even thinner layers of conducting material. This ability to force electric charges to mimic physical shapes is believed to be the basis of spontaneous resonance. Furthermore, this same ability appears to render the spontaneous resonance manifested by thin conductive layers self-calibrating from the standpoint that if the frequency of the driving oscillator varies to a substantial degree, the effect of spontaneous resonance will be maintained. This should be compared to the frequency critical nature of a passive resonant circuit placed in a linking relationship with a tuned oscillating circuit.

From the foregoing, if one now considers a coil designed in a spiral or helical manner and etched onto a printed circuit board, and such a coil is employed to excite a thin conductive layer, as previously described, an electric charge pattern bearing a close resemblance to the physical shape of the exciting coil will be produced in the thin metallic layer. This electrostatic coil will react upon the exciting coil in exactly the same manner as a conventional passive resonant circuit. However, the same will exhibit the advantage of inherently possessing an automatic tracking ability concerning the frequency of the exciting coil, and this tracking ability will cover a wide range.

Referring now to the drawings, and more particularly to FIG. 1 thereof, there is shown a block diagram serving to schematically illustrate a preferred switch embodiment of the instant invention. The switch embodiment of the invention illustrated in FIG. 1 is shown in a coin acceptor arrangement wherein coins of a predetermined denomination are being counted. The embodiment of the invention illustrated in FIG. 1 comprises a coin chute 2 through which coins 4 are selectively conveyed, a thin conducting layer 6 disposed thereon, a flat spiral coil 8, an oscillator 10 and a counter 12.

The coin chute 2 may be formed of lucite or other non-conductive material, in a manner well known to those of ordinary skill in the art, and is configured so as to have angled portions to slow the rate at which coins 4 deposited at the entry portion thereof traverse therethrough. Furthermore, the width of the coin chute 2 is such that stacking or overlapping of coins therein is avoided, and this result too is enhanced by the angled portions thereof. Thus, as indicated in FIG. 1, coins 4 are selectively disposed within the coin chute 2, as in the case of a vending machine or gaming device, and proceed through the chute toward the bottom portion thereof wherein the same may be further tested for genuineness, in a manner not here viewed as relevant, and then deposited into acceptance and rejection hoppers as in conventionally done in vending machines and gaming devices.

The thin layer of non-magnetic, conductive material 6 is disposed directly on the coin chute 2, in the manner indicated in FIG. 1, so that coins traversing through the chute will pass directly beneath the thin conducting layer 6 and separated therefrom only by the thickness of the walls of the coin chute and any difference in thickness between the depth of the chute and the coin. As will be appreciated by those of ordinary skill in the art as this disclosure proceeds, should the thickness of the coin chute 2 be approximately ⅛ inch or where the material and thickness of the thin conductive layer 6 and the frequency of the oscillator 10 admit of a larger spacing, the thin conductive layer 6 oscillator 10 admit of a larger spacing, the thin conductive layer 6 may be placed on one side of the coin chute 2 while the coil 8 may be placed on the other side thereof. This alternative is available since it is only the relative spacing therebetween which is here important as entry of a thicker metal layer which, in this case is the coin 4, will destroy the property of spontaneous resonance in the thin conductive layer 6 whenever the coin is placed adjacent thereto. Hence, whether the coin traverses the coin chute 2 in a manner to be disposed beneath the thin conductive layer 6, as shown in FIG. 1, or between the thin conductive layer 6 and the coil 8, as would occur if the coil 8 and the thin conductive layer 6 were mounted on opposite sides of the chute, does not matter a whit.

The thin conductive layer 6 may comprise any non-magnetic conductive material such as aluminum, silver, gold, zinc, copper or the like, as experience thus far indicates that any non-magnetic thin conductive material will exhibit spontaneous resonance. For this reason, thin conductive layer 6 shall be periodically referred to herein as spontaneous resonators and it will be understood by those of ordinary skill in the art that this term shall encompass any non-magnetic conductive material having a thickness which, in conjunction with the operating frequency of the driving oscillator, will exhibit the phenomena herein referred to as spontaneous resonance.

In the case of the instant embodiment of the present invention, a thin layer of aluminum provided with a paper-backed material was employed as the thin conductive layer 6, and the thickness thereof was in a range of from 5 to 8 microns. Those wishing to experiment with this phenomena should note that while materials of this type may be somewhat difficult to acquire in small quantities, the foil wrap employed in packages of Marlboro and Lark cigarettes acts as an appropriate spontaneous resonator. However, foil wraps employed in all forms of cigarettes do not work as it would appear that thickness characteristics are inadequate. In the embodiment of the invention illustrated in FIG. 1, spontaneous resonator 6 took the form of roughly a 1 inch rectangle; however, this configuration was selected solely from the standpoint of its relationship to the coin chute 2, the size of the coins which traverse thereunder, and the size of the coil 8 employed.

Figure 2A:
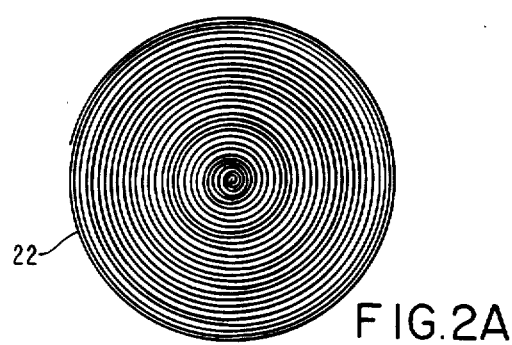
FIGS. 2A and 2B are top and side views, respectively, of an exemplary flat coil configuration suitable for use in the embodiment of the invention illustrated in FIG. 1, as well as in certain other embodiments of the invention.
Figure 2B:
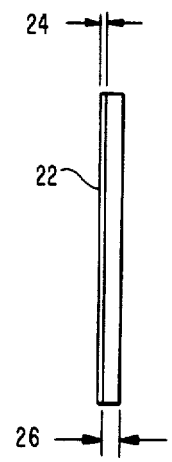

The coil 8, as shall be described in greater detail in connection with FIGS. 2A and 2B, is configured as a flat spiral coil which may be printed on a circuit board so as to have 8 to 32 turns per inch, although the number of turns to a large degree is a function of convenience in manufacture of the printed circuit board. However the coil 8, like the spontaneous resonator 6, should have a surface area which roughly corresponds or is greater than the cross-sectional size of the objects being sensed which, in this case, take the form of the coins 4. The inductance of the coil 8 may typically range from approximately 1 to 10 $\mu$h and its thickness may range from 200 to 300 microns, as is conventional in the printed circuit arts. Similarly, the coil may be made of tin lead plate on a conventional PC board and is formed as a single layer. The coil 8 is connected through the conductors 14 and 16 to the oscillator 10 and forms, as shall be seen in greater detail below in connection with FIG. 3, a portion of the resonant tank of the oscillator 10.

The oscillator 10 may take any of the well-known forms of this conventional form of device; however, as shall be seen in connection with FIG. 3 and hereinafter, Colpitts oscillator configurations are preferred since there is no requirement for a split coil therein. The same therefore accommodates a specialized coil such as coil 8 in the resonant tank circuit thereof. The oscillator 10 may have a frequency which varies as a function of the thickness of the spontaneous resonator 6 and is tuned thereto. For example, for spontaneous resonators having a thickness of 13 microns, a resonant frequency of 10 MHz was employed. However, when a thickness of approximately 8 microns was employed, a 7 MHz frequency was selected. Further in this regard, it should be noted that a thin layer may be formed as a sandwich structure as, for instance, the cumulative effect of 8 single micron layers is substantially the same as one 8 micron layer. The output of the oscillator, as provided on conductor 18, is connected to the input of the counter means 12. The counter means 12 may take any of the conventional forms of this well-known class of device and here acts, as shall be appreciated by those of ordinary skill in the art, to count each burst of oscillations output by the oscillator means 10, and hence, count the number of coins inserted into the coin chute 2. Those of the ordinary skill in the art will appreciate that the embodiment of the invention illustrated in FIG. 1 comprises what is tantamount to a microswitch embodiment, and hence, the output of the oscillator 10 provided on conductor 18 may be employed to actuate any desired device which is to be actuated in response to a closure of the contactless microswitch or proximity sensor illustrated in FIG. 1.

In operation of the switch embodiment of the invention illustrated in FIG. 1, it will be appreciated that with the spontaneous resonator 6 disposed adjacent to the coil 8 and displaced approximately ⅛ inch therefrom, the spontaneous resonator will act precisely as a passive resonant circuit tuned to the same frequency as the oscillator 10, and hence, cut off all oscillation. Furthermore, this condition will persist even under circumstances where, due to ambient or aging conditions, the tuned frequency of the oscillator 10 shifts since it is a characteristic of the spontaneous resonator 6 to track the frequency of the oscillator 10 so long as all portions thereof are equally distant from the coil 8 of the resonant tank circuit of oscillator 10. Thus, when no coins are placed within the coin chute 2, no output is provided by the oscillator 10 on conductor 18 so that the counter 12 remains in a previously established condition.

When a coin 4 is placed into the coin chute 2, the same will traverse the chute in the normal manner. Upon passing beneath the spontaneous resonator 6, the spontaneous resonator 6 will lose its characteristic as a passive resonant circuit since the same now manifests a thickness characteristic attributable not only to its own thickness, but also due to that associated with the conductive metal coin 4. Under these circumstances, the oscillator 10 resumes its state of maximum oscillation whereupon a signal is produced on conductor 18 for an interval corresponding to a substantial portion of the transit time of the coin 4 beneath the spontaneous resonator 6. This signal on conductor 18 will be counted by the counter 12 and employed in a well-known manner to increment by one the state of the count therein.

As soon as the major portion of the coin 4 has exited from the portion of the coin chute 2 underlying the spontaneous resonator 6, the spontaneous resonator 6 will resume the characteristics of a thin layer of conductive, non-magnetic material, and hence, again exhibit spontaneous resonance. Under these circumstances, the oscillator 10 will again be shut down so that no further output is present in conductor 18.

The instant embodiment of the invention has been built and tested and has been found to be a highly reliable, extremely fast-acting contactless microswitch which appears to hold great promise in that the same is not subject to wear, is capable of encapsulation, and is operative in and uneffected by the dusty, dirty and smoke-filled environments in which microswitches of this type are frequently required to operate. It thus represents a major advantage over contactless forms of microswitches or proximity sensors employing optics, sonics or even magnetics.

From the foregoing, those of ordinary skill in the art will realize that the switch embodiment of the invention illustrated in FIG. 1 is operated in a mode where the spontaneous resonator 6 normally maintains the oscillator 10 in a shut down condition until such time as the spontaneous resonance exhibited thereby is terminated by passage of an item to be sensed. While this item here has been shown as coins, those of ordinary skill in the art will realize that essentially the same switch embodiment may be employed for a myriad of uses such as sensing bottle caps, or any other metallic object to be counted, which may be passing along a conveyor belt or the like. Furthermore, while the embodiment of the invention illustrated in FIG. 1 shows the output of the oscillator 10 being counted, it will be appreciated that such output may be employed to actuate any well-known means for providing an indicia of the condition sensed, or alternatively, actuating a next step in a process or the like. In addition, when non-metallic items are to be counted or otherwise sensed, the opposite mode of operation is available wherein the oscillator is normally maintained in an enabled state and the selective passage of spontaneous resonators applied to the items to be counted or sensed are operative to selectively shut down the oscillator each time one such item passes beneath the coil 8.

Referring now to FIGS. 2A and 2B, there are shown top and side views, respectively, of an exemplary flat coil configuration suitable for use in the embodiment of the invention illustrated in FIG. 1, as well as certain other embodiments of the invention wherein the spontaneous resonator employed is configured as a flat layer. The flat coil illustrated in FIGS. 2A and 2B takes the form, as best shown in FIG. 2A, of a spiral coil printed on a PC board. The coil illustrated in FIGS. 2A and 2B is prepared using conventional printed circuit techniques, although other techniques for forming a flat coil could be used as well. The spirally wound coil 22 illustrated in FIG. 2A was printed in a manner to have 32 turns per inch; however, it has been found that coils having 16 turns per inch may be employed as well and there is no degradation in the operation of the embodiment illustrated in FIG. 1. Furthermore, coils exhibiting 16 turns per inch are more simply manufactured as there is less difficulty associated with shorted turns and the like. Additionally, printed coils employing only 8 turns per inch have proven acceptable in many embodiments of the instant invention.

As is typical of printed circuits used today, tin lead plate has been employed for the conductor material printed and, as shown in FIG. 2A, the thickness thereof, as indicated by the reference numeral 24, may vary from 200 to 300 microns, as is conventional in the printing of circuit boards. The spirally wound coil 22 is printed on a conventional thickness PC board having a thickness indicated by the reference numeral 26 of approximately 0.06 inches or the like. Those of ordinary skill in the art will appreciate that this dimension is one of manufacturing convenience rather than being highly pertinent to any aspect of the instant invention.

In actual embodiments of the instant invention which have been built and tested, the particular spirally wound printed circuit coil illustrated in FIG. 2 exhibited an inductance of approximately 2 $\mu$h; however, suitable results have been obtained with similarly configured coils exhibiting values of inductance of from 0.5 to 10 $\mu$h. Again, those of ordinary skill in the art will appreciate that the particular value of inductance exhibited by the coil is merely a factor employed in selecting the frequency of the tuned oscillator 10, and hence, falls within the category of a design choice. What appears to be of substantial importance, however, is that the coil configured have the majority of the turns thereon parallel and equally distant from the surface of the spontaneous resonator 6. Thus, if a flat spontaneous resonator is employed, a flat coil configuration should also be employed. Conversely, should it be desired to employ regularly wound coils, the spontaneous resonator, as shall be seen in subsequent embodiments of the instant invention, should be similarly configured.

Figure 3:
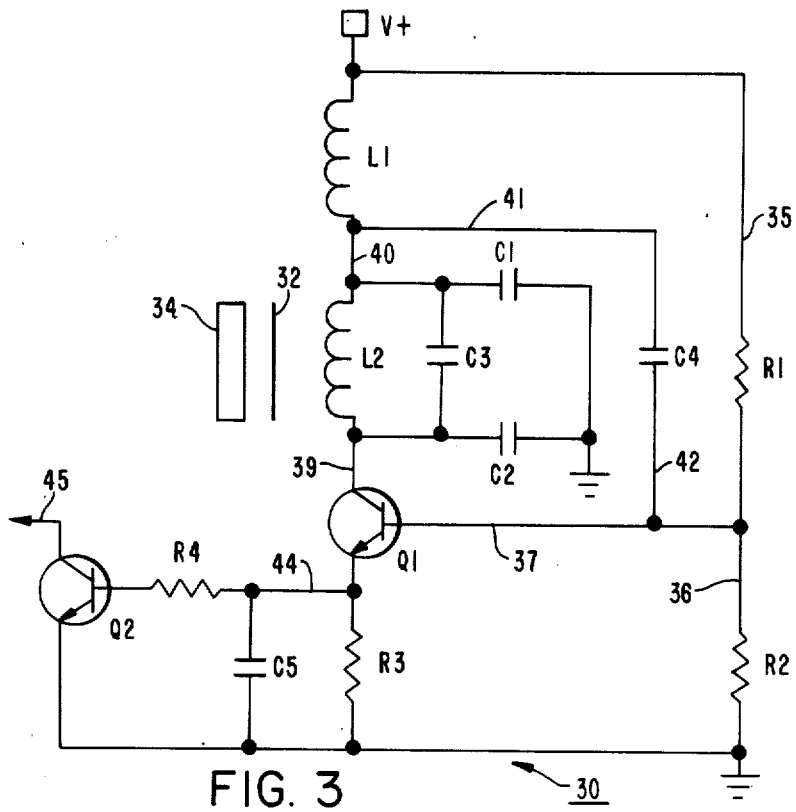
FIG. 3 is a block diagram serving to schematically illustrate an exemplary oscillator configuration suitable for use in the embodiment of the invention shown in FIG. 1 and additionally shows a preferred proximity sensor embodiment according to the instant invention.

Referring now to FIG. 3, there is shown a block diagram serving to schematically illustrate an exemplary oscillator configuration suitable for use in the embodiment of the invention shown in FIG. 1 as well as in certain other embodiments of the present invention. Additionally, FIG. 3 shows a preferred proximity sensor embodiment of the instant invention. More particularly, in oscillator 30 a spontaneous resonator 32 and a target 34 are illustrated, the details of the oscillator 30 being shown for purposes of setting forth an exemplary oscillator configuration which may be employed in the switch embodiment of the invention depicted in FIG. 1. Furthermore, the location of the spontaneous resonator 32 and a target 34 are also set forth so that the electrical relationship in an exemplary proximity sensor embodiment of the instant invention is also provided.

The oscillator 30 takes the form of a modified Colpitts oscillator having characteristics which are preferred for digital applications of the instant invention wherein the user is principally interested in an on/off, 1/O or Yes/No form of output. However, this oscillator may be readily employed in analog applications wherein a limited range of motion for a target 34 is acceptable, or alternatively, the Q thereof may be increased to extend the analog range available. Furthermore, those or ordinary skill in the art will appreciate that while a Colpitts oscillator configuration is here employed, any other well known form of oscillator configuration such as a Hartley oscillator or the like may be used as well. It should be noted, however, that a Colpitts oscillator configuration is viewed as having a particular advantage in connection with use in embodiments of the instant invention. This advantage relates to the fact that Colpitts oscillator configurations do not require a split winding as do most other forms of classical oscillator configurations. Additionally, Colpitts oscillators are highly stable.

The oscillator 30 illustrated in FIG. 3 comprises an RF choke L1, a resonant tank circuit formed by the coil L2 and the capacitors C1–C3 and first and second bipolar transistors Q1 and Q2. The RF choke L1 is connected, as illustrated in FIG. 3, intermediate voltage source V+ and the coil L2. The RF choke L1 performs the function of isolating the voltage supply V+ from the RF oscillator and allowing an oscillating potential to exist at the junction of the RF choke and the coil L2. The junction between the voltage supply V+ and the coil L1 is connected through conductors 35 and 36, as well as resistors R1 and R2, to ground wherein resistors R1 and R2 form a bias source for the base of bipolar transistor Q1. The junction between resistors R1 and R2 is connected through conductor 37 to the base of the transistor Q1 in the manner indicated in FIG. 3.

The coil L2 and capacitors C1 and C2 form a conventional split capacitor Colpitts tank circuit while the capacitor C3 serves the function of lowering the Q of the Colpitts tank for optimum sensitivity in association with the thickness of the spontaneous resonator 32 employed and the target 34 to be detected. The coil L2 may take precisely the same form of printed circuit coil described in association with FIGS. 2A and 2B so that the same presents a radiating surface which is at all points equally distant from the spontaneous resonator 32. The coil L2, as was discussed in connection with FIGS. 2A and 2B, may have a diameter of approximately 1 inch and exhibit either 16 or 32 turns per inch, depending upon the Q of the circuit selected and the thickness of the spontaneous resonator 32 chosen. The capacitors C1–C3 may have typical values of 100 pf each.

The Colpitts tank circuit formed by the coil L2 and the capacitors C1–C3 is connected through the conductor 39 to the collector of transistor Q1 and through the conductors 40 and 41, capacitor C4 and the conductor 42 to the base of the transistor Q1 to form a feedback loop. The emitter of the transistor Q1 is isolated from ground by the resistor R3 and connected through conductor 44 to a bypass capacitor C5 and through resistor R4 to the base of the transistor Q2. Both transistors Q1 and Q2 may take conventional forms of NPN devices such as 2N3904 transistors as conventionally available from Motorola Inc. The emitter of the transistor Q2 is connected directly to ground while the collector provides the output of the oscillator which may be connected to a scope, a counter as shown in FIG. 1, or any other device for providing an indicia that a target has been detected, or alternatively, for implementing the next step in a processing operation.

The modified Colpitts oscillator 30 here has a frequency of approximately 10 MHz and is preferably employed in connection with a spontaneous resonator 32 having a thickness of approximately 8 microns. The target 34 may be a coin, a bottle cap or any other metallic object whose proximity is to be detected. The spontaneous resonator will have an area of approximately 1 square inch for the size of the coil L2 described and it is assumed that comparably sized targets are being detected.

Those of ordinary skill in the art will now appreciate that the embodiment of the invention illustrated in FIG. 3 is operated in a mode wherein the output of the oscillator on conductor 45 is essentially zero when no target 34 is in position overlying the spontaneous resonator 32. Under these conditions, the voltage divider network formed by resistors R1 and R2 acts to bias the base of transistor Q1 to a low level, approximately 0.652 volts for the exemplary values given above and assuming that the supply V+ has a value of approximately 5 volts. This will produce an emitter voltage on conductor 44 corresponding to 0.1 volt and a non-oscillating current of 0.33 ma for the values set forth above. This 0.1 volt level at the emitter of transistor Q1 is insufficient to turn on the open collector transistor Q2, and hence, no output will be provided at the output of the oscillator connected to conductor 45.

When a target 34 is placed in proximity to the spontaneous resonator 32, i.e., within a quarter-inch therefrom, the capacity of the spontaneous resonator 32 to act as a passive resonant circuit will be destroyed, as aforesaid. Under these conditions, the circuit will oscillate. Thus, when a target 34 is placed in proximity to the spontaneous resonator 32, a portion of the 7 volt peak-to-peak oscillating signal produced by this oscillator under the conditions assumed above will be coupled to the base of the transistor Q1 via the feedback capacitor C4. The transistor Q1 then operates as a class C amplifier conducting only during a portion of the positive peak of the base input signal. The emitter bypass capacitor C5, under these conditions, will maintain the conductor 44 at a level of approximately 1.5 volts and this level is applied to the base of the transistor Q2 through resistor R4. This is sufficient to saturate the open collector transistor Q2 whereupon a low level output will be provided to a load connected to conductor 45. Under normal conditions, the oscillator illustrated in FIG. 3 will draw 0.33 ma during a non-oscillating mode and 5 ma during an oscillating condition.

Those of ordinary skill in the art will appreciate that while an oscillator has been disclosed in connection with a proximity sensing embodiment of the instant invention, such oscillator may be employed as the driving arrangement for any of the embodiments of the instant invention described herein, so long as the coil L2 is configured to parallel the surface of the spontaneous resonator 32. Furthermore, while the instant circuit has been described as employing bipolar transistors, those of ordinary skill in the art will appreciate that any active device such as an FET may alternatively be utilized.

Figure 4:
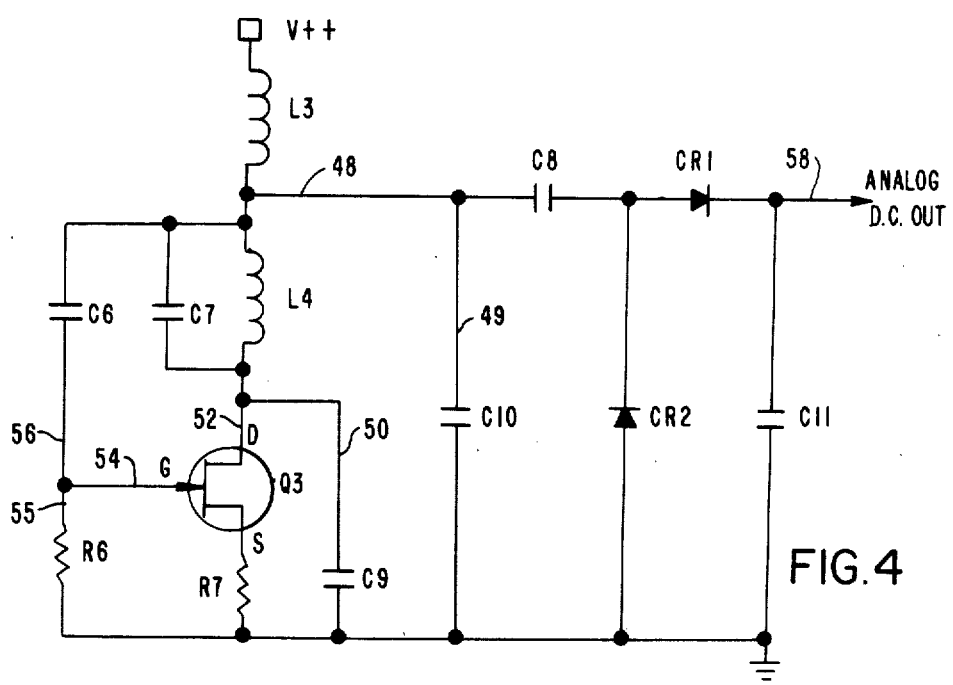
FIG. 4 is a block diagram serving to schematically illustrate another exemplary oscillator configuration suitable for use in analog embodiments of the present invention.

Turning now to FIG. 4, there is shown a block diagram serving to schematically illustrate another exemplary oscillator configuration suitable for use in analog embodiments of the present invention. The embodiment of the oscillator illustrated in FIG. 4 is preferably employed in applications of the instant invention wherein the designer is desirous of relying upon a change in the output of the driving oscillator to indicate the closeness of an object being sensed. This occurs between the point at which the oscillator amplitude is first effected by the object being sensed or a thin layer of conductive material to the point at which oscillations break out or are terminated. For these embodiments, oscillating configurations are employed in conjunction with a spontaneous resonator which exhibits a somewhat greater range of affectation as it approaches a coil or, in an alternate mode, as an object to be sensed begins to effect the spontaneous resonance exhibited by a thin inductive layer of conductive material in place with respect to a coil.

More particularly, in digital applications of this invention, it has been found that the ability of a spontaneous resonator to shut down an oscillator is normally effected when a thicker conductive object to be sensed is approximately ¼ inch from the surface of the resonator and exhibits a substantially increasing effect on the spontaneous resonance exhibited by such a resonator until the same is approximately ⅛ inch from the surface thereof, at which time oscillations having maximum magnitude break out. Conversely, if a spontaneous resonator is brought up to the face of a printed circuit coil, the magnitude of the oscillations exhibited by the driving oscillator are first effected when the resonator is approxiately ¼ inch away from the surface thereof and the magnitude of the oscillations are decreased in essentially an increasing manner until such time as the resonator is approximately ⅛ inch from the face of the printed circuit coil, at which time oscillations are completely damped out. The use of the oscillator illustrated in FIG. 4 in conjunction with a suitable spontaneous resonator will substantially extend this range in that, to date, an effective linear range from ⅜ inch to 1/16 inch has been obtained, and it is fully expected that this range too may be expanded.

The exemplary oscillator illustrated in FIG. 4 comprises an RF choke L3, a resonating coil L1, resonant tank capacitors C7, C9 and C10, a transistor Q3 and a rectifying circuit formed by the diodes CR1 and CR2. The embodiment of the oscillator illustrated in FIG. 4 again comprises a modified Colpitts oscillator for the reasons set forth above. The RF choke L3 is connected to a source of potential V++ which may typically range in value from 10 to 15 volts. The RF choke L3 acts, in the manner described in connection with FIG. 3, to isolate the power supply V+ and from the RF oscillator and allow an oscillating potential to exist at the junction with the coil L4.

The coil L4 may take precisely the same form of printed circuit coil described in connection with FIGS. 2A and 2B, and if such a printed circuit coil is employed, the same may have either 32, 16 or even 8 turns per inch. The coil L4 forms the coil for the resonant tank of the Colpitts oscillator formed and is connected through conductors 48-50 to capacitors C9 and C10 which form the two split capacitors of a resonant tank in a Colpitts oscillator. The capacitor C7 is connected across the coil L4, in the manner shown, for purposes of modifying the Q of the circuit in precisely the same manner described in connection with capacitor C3 in FIG. 3. Thus, again, a modified Colpitts oscillator is utilized.

The output of the resonant tank circuit formed is connected through conductor 52 to the drain of the transistor Q3 which, as shown, may take the conventional form of an FET device. For instance, a J309 FET transistor, as conventionally available from National Semiconductor may be employed. The source of the transistor Q3 is connected through the resistor R7 to ground, while the gate thereof is connected through conductors 54-56 to resistor R6 and feedback capacitor C6. Thus, a conventional configuration Colpitts oscillator is formed having the resonant tank circuit thereof modified by the presence of the capacitor C7 which serves in the function of lowering the Q of the tank circuit for appropriate target sensitivity.

The output of the oscillator on conductor 48 is connected through the coupling capacitor C8 to the rectifying network formed by the diodes CR1 and CR2 so that a rectified output is available from the oscillator on conductor 58. DC is removed from this output by the action of the coupling capacitor C8. Those of ordinary skill in the art will appreciate that the diodes CR1 and CR2 comprise a conventional fullwave rectifier arrangement for providing an analog, DC output from the oscillator, while the capacitor C11 connected between the conductor 58 and ground provides a conventional AC bypass.

In operation of the oscillator circuit illustrated in FIG. 4, the spontaneous resonator is positioned so that its proximity to the oscillator coil L4 is a function of the object to be sensed and a sufficient range of operation for the desired application is obtained. Conversely, the object to be sensed may employ a spontaneous resonator to provide for the second class of operation of this device. In the first case, the spontaneous resonator positioned in relation to the coil L4 will hold the oscillator illustrated in FIG. 4 shut down until a conductive object to be sensed comes into appropriate spatial relationship with the spontaneous resonator. At this point, oscillations will begin to break out, in substantially the same manner described in connection with FIG. 3. As such object more closely approaches the coil L4, the magnitude of these oscillations will increase until oscillations corresponding to substantially twice the full supply voltage are obtained.

Once oscillations break out, each half cycle of an oscillation, when present, will be rectified by the diode combination CR1 and CR2 and provided as an analog DC output at the conductor 58. Thus, in this mode of operation, oscillations will break out when the object to be sensed is at the maximum range for the coil L4 and will increase until minimum range is obtained, at which time the magnitude of oscillations will correspond essentially to twice the supply voltage.

The converse situation obtains for the second mode of operation wherein spontaneous resonators are applied to the object to be sensed to selectively effect the output of the oscillator illustrated in FIG. 4. Under these conditions, as such an object enters the maximum range for the spontaneous resonator, the output at the conductor 58 will selectively decrease until such time as the minimum range is achieved whereupon the oscillator completely shuts down. Those of ordinary skill in the art will appreciate that the oscillator configuration illustrated in FIG. 4 is most advantageous in applications of the instant invention involving pressure measurement, weight measurement, strain gauges, thickness measurement and any other application wherein an analog output relating to a condition being measured within a range is desired.

Figure 5:
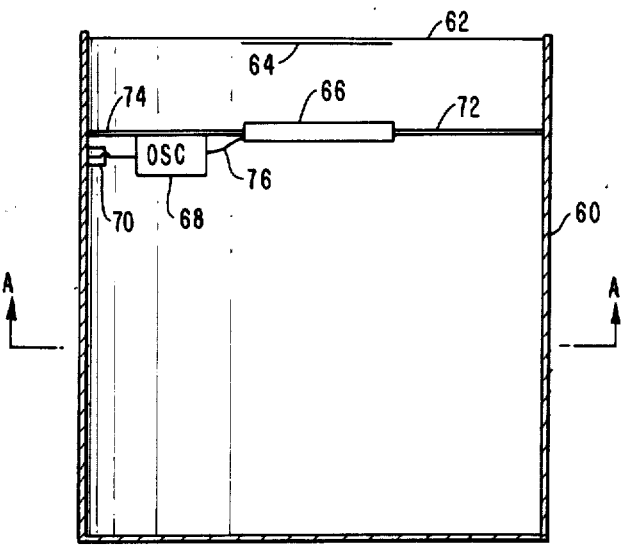
FIG. 5 is a schematic diagram, partially in block, illustrating a preferred modulator embodiment of the instant invention employed to form an electric drum.

Referring now to FIG. 5, there is shown a schematic diagram, partially in block, illustrating a preferred modulator embodiment according to the instant invention employed to form an electric drum. The structural configuration of the drum illustrated in FIG. 5 is shown in section through the line AA. The embodiment of the invention illustrated in FIG. 5 comprises a drum body 60 shown in cross-section, a drum head 62 taking the normal form of tighly stretched drum skin material, a spontaneous resonator 64, a printed circuit coil 66 having only a single layer, an oscillator 68 and an output terminal 70.

The drum body 60 and drum head 62 may in all ways be conventional and essentially any form of drum available in the marketplace may be employed. Experimentation to date has indicated that when the drum head 62 is impacted, the maximum displacement exhibited at the central portion thereof is approximately ¼ inch, and hence, this disclosure will proceed as a result of those findings. However, it is obvious that for certain types of extremely large drums such as kettle drums or the like, somewhat larger excursions may be exhibited by the drum head, and under those circumstances, the spacing set forth herein will be varied accordingly.

As shown in FIG. 5, a spontaneous resonator 64 is mounted so that the central portion thereof is affixed to the central portion of the drum head 62. The spontaneous resonator 64 may comprise any of the forms of material noted above, and similarly, any of the previously discussed range of thicknesses may be utilized. However, it is preferred that relatively thin spontaneous resonators, i.e., 5 to 10 microns, be employed in conjunction with an oscillator 68 having a relatively high Q. This will accommodate larger spacing availability between the onset of the effect of spontaneous resonance upon the oscillator 68 and a shutting down of oscillation to establish a maximum modulating range. In addition, the shape of the spontaneous resonator 64 may be round, rectangular or the like, but it is preferred that the shape correspond to that of the drum head 62. Furthermore, while 1 inch resonators in the form of a disk or rectangle may be employed, differing modulating characteristics may be achieved by increasing or decreasing the surface area of the spontaneous resonator 64.

The coil 66 may take the conventional form of a single layer printed circuit coil of the type described in connection with FIG. 2, having either 32, 16 or 8 turns per inch, as is appropriate to accommodate the thickness of the spontaneous resonator employed and the Q selected for the oscillator 68. The coil 66, as illustrated in FIG. 5, is supported on or suspended from a pair of support members 72 and 74 which are connected to opposing points on the periphery of the drum body 60. In actuality, a single support member may be disposed across the interior of the drum body 60 in the position illustrated in FIG. 5, and thereafter, the coil 66 mounted thereon in a position to directly underlie the spontaneous resonator 64. The printed circuit coil 66 is preferably disposed so that the surface thereof resides approximately ¼ inch beneath the surface of the spontaneous resonator 64 when the drum head 62 is not displaced. This positions the thin conductive layer 64 at the point of onset of the spontaneous resonance effect on the oscillator 68 when the drum head 62 is not displaced by virtue of being impacted with drum sticks or the like.

The printed circuit coil 66 is connected through the conductor 76 to the oscillator 68 and forms the coil for the tuned tank circuit thereof. The oscillator 68 may take either of the forms illustrated in FIGS. 3 and 4 since the excursions associated with the drum head are here well within the range of either embodiment. However, if greater excursions are anticipated, an analog version of an oscillator, such as is illustrated in FIG. 4, is preferred. The oscillator 68 is also mounted directly to the support member 74, in the manner indicated in FIG. 5. The output of the oscillator is connected to an output jack 70 which may be interconnected to an electronic amplifier of a kind typically in use for electric instruments today. While not illustrated in FIG. 5, either the oscillator 68 or the amplifier connected to terminal 70 should be provided with an appropriate filter or the like for purposes of demodulating the output of the oscillator 68.

In operation of the embodiment of the invention illustrated in FIG. 5, the oscillator 68 will oscillate at half its peak amplitude whenever the same is energized and the drum head is not struck. This output, as filtered to remove the carrier associated with the oscillator 68, will be applied to a suitable instrument amplifier and sound equipment. However, because the carrier associated with the oscillator 68 is removed, no sound will be produced thereby. As the drum head 62 is struck by a drum stick or the like, the magnitude of the peak-to-peak oscillations of the oscillator 68 will be decreased and increased as a function of the excursion of the drum head and the spontaneous resonator 64 attached thereto toward and away from the coil 66. This will result in envelope modulation corresponding in magnitude and frequency to excursions of the drum head 64 caused by the impacting by a drum stick or the like. This envelope modulation is provided to the amplifier and sound system through terminal 70 to produce true and accurate electronic representation of the percussion being played.

Those of ordinary skill in the art will appreciate that while the position of the spontaneous resonator 64 and the printed coil 66 could be reversed, in practice, the mounting arrangement illustrated in FIG. 5 is highly advantageous as the thin layer 64 of conducting material represented by the spontaneous resonator 64 will in no way color or modify the excursions of the drum head. Furthermore, since in this embodiment the spontaneous resonator 64 acts as a contactless modulator, no other influence upon the normal operation of the drum occurs.

The modulator embodiment of the invention illustrated in FIG. 5 is also highly advantageous because the same is not frequency or bandwidth limited and in no way effects normal operation or construction of the drum. In fact, in embodiments of this invention which have been built and tested, conventional drums purchasable at any music store were employed and it was found that the electronic modulator illustrated in FIG. 5 could be readily mounted therein without either effecting the operation or appearance of the resulting drum. To applicant's knowledge, existing drum pickup instrumentation employs conventional microphones. Therefore, other instruments and extraneous sounds are detected, making this technique less than desirable. However, employing modulating configurations according to the instant invention render electric drums readily available and only the use of a pickup employing spontaneous resonance is required. Another advantage of the modulator embodiment of the invention lies with the fact that the modulated RF oscillator may be transmitted remotely, eliminating a need for interconnect cables.

Figure 6A:
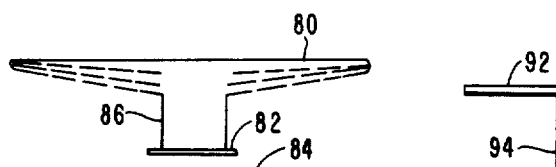
FIGS. 6A and 6B are front and top views, respectively, of another modulator embodiment of the present invention employed to form a microphone.
Figure 6B:
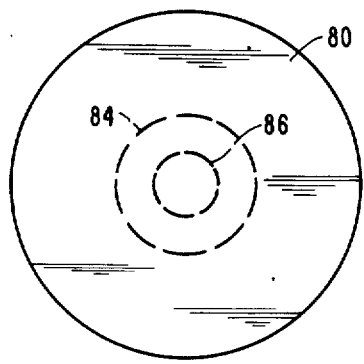

Referring now to FIGS. 6A and 6B, there are shown top and front views, respectively, of another modulator embodiment of the present invention here employed to form a microphone. The embodiment of the invention illustrated in FIGS. 6A and 6B takes the form of a microphone comprising a diaphragm 80, a spontaneous resonator 82 and a printed circuit coil 84 of the type illustrated in FIGS. 2A and 2B. No oscillator or output from an oscillator is shown as connected to the coil 84 since those of ordinary skill in the art will appreciate that the same are utilized in precisely the same manner shown in FIG. 5 and explained heretofore.

The diaphram 80 is formed of flexible material such as rubber or the like and is used in the microphone formed as a voice cup configured to be displaced in the manner indicated by the dashed lines as a function of someone speaking, singing or otherwise applying modulated acoustic energy thereto. The diaphram 80 is configured, in the manner shown, to concentrate the sound waves applied over a relatively wide surface area into a narrow necked portion 86. The spontaneous resonator 82 may be of the type described above and is mounted across the narrow neck 86 of the diaphram in the manner illustrated in FIG. 6A. A printed circuit coil 84, as heretofore described, is disposed therebeneath and spaced therefrom by a distance essentially corresponding to ¼ inch when the diaphram is not displaced. With diaphrams 80 employed to date, displacement of the spontaneous resonator 82 toward the printed circuit coil 84 have been maximized at a distance of ¼ inch. Under these circumstances, either of the oscillator configurations illustrated in FIGS. 3 or 4 may be connected to the coil 84 and employed in precisely the same manner as described in connection with FIG. 5. This, of course, will be a function of the design of the diaphragm 80, and hence, should greater excursions be involved, an oscillator configuration such as is illustrated in FIG. 4, should be employed.

The actual operation respecting the interaction between the diaphram 80 and, more particularly, the spontaneous resonator 82 and the printed circuit coil 84, which serves as the inductor within the tank circuit of an oscillator, not shown, will be precisely the same as described in connection with FIG. 5, and hence, need not be reiterated. Those of ordinary skill in the art will appreciate that this microphone configuration in the form of a contactless modulator is highly advantageous in that the same will admit of diaphrams having different characteristics for different users, and the resulting microphone is not frequency or bandwidth limited, as is normally the case with carbon type microphones.

Figure 7:
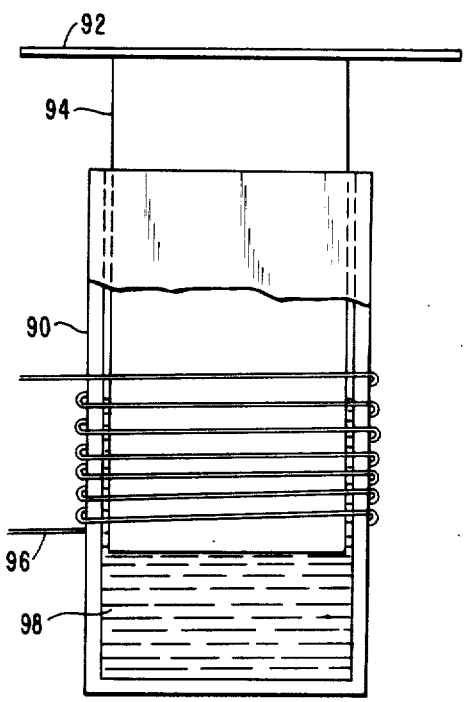
FIG. 7 is a block diagram serving to schematically illustrate an exemplary sensor embodiment of the instant invention suitable for use as a scale or pressure sensing device.

Referring now to FIG. 7, there is shown a block diagram serving to schematically illustrate an exemplary sensor embodiment of the instant invention usable as a scale, pressure sensing device or the like. The embodiment of the invention illustrated in FIG. 7 comprises a cylinder 90, a platform 92, a piston 94 and a coil 96. Those of ordinary skill in the art will now appreciate that the coil 96 is preferably wound as a single layer and is connected within the resonant tank circuit of an oscillator, not shown. The oscillator may take either of the forms illustrated in FIGS. 3 or 4 and the output of the oscillator may be connected to a suitable indicating device for purposes of displaying the condition sensed.

Cylinder 90 may be circular in cross-section, although any convenient shape may be employed, and may be formed of plastic or other suitable forms of non-conductive material. Disposed within the cylinder 90 is a small reservoir of a conductive liquid 98 such as mercury, as well as the piston 94. Those of ordinary skill in the art will appreciate that suitable sealing means, not shown, may be disposed, if desired, between the top portion of the inerior walls of the cylinder 90 and the piston 94 to prevent the conductive liquid 98 from spilling from the cylinder under cases of extreme pressure or the like. Affixed to the upper portion of the piston 94 is a suitable platform 92 so that in embodiments of the instant invention used as a scale, items to be weighed may be disposed directly thereon, while in pressure sensing arrangements, the same may be placed in fluid communication with whatever fluid is to be measured.

Although not illustrated in FIG. 7, a suitable biasing means is provided between the underside of the piston 94 and the bottom of the cylinder 90 to offset whatever weight or pressure is applied to the platform 92 so that the piston 94 is only displaced in a downward direction as a result of overcoming the bias applied. The bias means may take the form of a calibrated spring or the like exerting an opposing force on the piston 94 so that an appropriate measure of what is being weighed is achieved by downward placement of the piston 94 against the opposing force.

Coil 96 may take the form of a conventional helical coil, preferably wound as a single layer, and is appropriately positioned about the periphery of the cylinder 90 so that the various turns thereof are selectively linked by conductive liquid 98 forced into the gap between the interior walls of the cylinder 90 and the piston 94 as the piston 94 is depressed. Although not shown in FIG. 7, an oscillator of the type disclosed in FIGS. 3 or 4 is connected to the coil 96 in such a manner that the coil 96 replaces the printed circuit coil described therein. Additionally, a suitable indicating device, not shown, may be connected to the output of the oscillator means.

In operation of the embodiment of the invention illustrated in FIG. 7, whenever an object is to be weighed or when the force associated with a pressure measurement or the like is imposed on the platform 92, the piston 94 and platform 92 will be displaced in a downward direction as the opposing bias on the piston 94 is overcome by the force exerted on the platform 92. This will cause a thin layer of conductive liquid 98 to be forced upward in the interface between the outside periphery of the piston 94 and the interior wals of the cylinder 90. As the level of conductive liquid 98 rises, more and more turns of the coil 96 will be linked by a thin layer of conductive liquid 98. A conductive liquid 98 such as mercury, like other non-magnetic thin conductive layers experimented with to date, exhibits the phenomena of spontaneous resonance.

As each turn of the coil 96 is linked, the amplitude of the output of the oscillator will vary from full peak-to-peak voltage when no turns are linked, to shut down as the uppermost turns are linked. Here, however, the inductive portion of the tank circuit of the oscillator formed by the coil 96 should be viewed as a series of coils formed by each turn, and hence, as the level of conductive liquid 98 rises, energy from that particular turn is removed from the oscillating circuit until such time as the oscillator is shut down.

Those of ordinary skill in the art will appreciate that the embodiment of the invention illustrated in FIG. 7 is highly desirable in that a wholly contactless sensing of the condition being measured is provided and the general type of sensor established will admit of a multitude of applications. In this embodiment, the oscillator configuration illustrated in FIG. 4 will be generally preferred as a substantial analog range is desirable. This analog range, as will be appreciated by those of ordinary skill in the art, will reside through the major section of the coil 96, i.e., excluding the first and last few turns.

Figure 8:
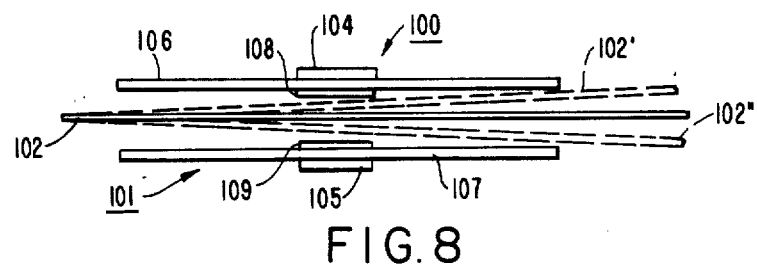
FIG. 8 is a block diagram serving to schematically illustrate another sensor embodiment of the present invention configured as an off-center detector.

Referring now to FIG. 8, there is shown a block diagram serving to schematically illustrate another sensor embodiment of the present invention here configured as an off-center detector. The off-center detector illustrated in FIG. 8 comprises a pair of analog sensors 100 and 101 configured in accordance with the teachings of the instant invention and symmetrically disposed about conductive material 102 which is being processed in association with web feeding or winding and reeling techniques. More particularly, in the manufacture of wire and cable or sheets of material, it is frequently imperative that the material being processed be maintained within a precise location so that disposition is appropriate for introduction into the next processing stage. This is of critical importance in running wire machines, for instance, where the wire being formed must be heat treated when it is in the center of a following dye, or in the manufacture of coins or tokens in the form of a composite sandwich of materials wherein each sheet of a material is introduced at a predetermined location for combination with the other materials. Those of ordinary skill in the art will be familiar with a virtual plethora of applications such as this where the location of a material being processed must be precise, yet contact with the running material is foreclosed.

Each of the analog sensors 100 and 101 illustrated in FIG. 8 comprise a flat printed coil 104 and 105, of the type described in connection with FIGS. 2A and 2B. The coils 104 and 105 each serve as the inductor within the resonant tank of an individual oscillator of the type shown in FIGS. 3 or 4, not shown in FIG. 8. Each oscillator associated with the coils 104 and 105 is provided with an individual output and such outputs may be combined and/or compared to provide an indication of the position of the conductive material 102 in association with its deviation from a predetermined central position, as well as the direction of such deviation. The coils 104 and 105 are each mounted on a support 106 and 107 which may be formed of plastic, wood or any other suitable non-conductive material as is convenient. Those of ordinary skill in the art will appreciate that the supports 106 and 107 should either manifest a thickness corresponding to a thickness in which a spontaneous resonator will shut down the oscillations of the oscillator connected to the coils 104 and 105. Alternatively, the supports 106 and 107 may be thicker and have channel portions wherein the printed circuit coils 104 and 105, as well as opposing spontaneous resonators, may be inset.

Mounted on each of the supports 106 and 107, in an opposing relationship to each of the coils 104 and 105, are spontaneous resonators 108 and 109 of the type heretofore described. The spontaneous resonators 108 and 109 are displaced from the respective coils 104 and 105 by a distance such that absent proximity to conducting material 102, each of the spontaneous resonators 108 and 109 shuts down the oscillators associated with the coils 104 and 105 so that neither oscillator provides any output. Alternatively, should the conductive material 102 comprise an extremely thin coating which is being processed with a backing material, independent spontaneous resonators 108 and 109 may be omitted and the printed circuit coils 104 and 105 positioned more closely to the material 102 being treated which would then act directly as a spontaneous resonator.

Those of ordinary skill in the art will appreciate that in the embodiment of the invention illustrated in FIG. 8, the operation is such that when the strip of conductive material 102 is in the proper position indicated, the outputs of the oscillators associated with printed circuit coils 104 and 105 will be zero to indicate the presence of an approprite central position. However, should the wire or web begin to deviate, in the manner indicated by the dashed position locations indicated by 102' and 102", spontaneous resonance associated with the appropriate one of the spontaneous resonators 108 and 109 will be destroyed. Thus, if it is assumed that the proper central position for the conductive material 102 is a displacement of ¼ inch from the surface of each of the spontaneous resonators 108 and 109, no output will be provided by the oscillator associated with either of the coils 104 or 105 so long as this condition persists.

When the wire or web associated with conductive material 102 begins to deviate to a position indicated by the dashed block 102', the spontaneous resonance associated with the thin layer of conductive material 108 will be reduced. Under these conditions, the oscillator associated with the printed circuit coil 104 will begin to have an output whose magnitude is a function of and apparently linearly related to the closeness of the conductive material 102 to spontaneous resonator 108. The spontaneous resonance associated with the thin layer of conductive material 109 will be maintained. Therefore, an appropriate indication as to the magnitude of the displacement and its direction may be readily provided using conventional differential techniques. The winding and reeling devices conveying the conductive material 102 may thus be adjusted manually or automatically until such time as the oscillations from the oscillator associated with printed coil 104 terminate. Those of ordinary skill in the art will appreciate that the converse conditions obtain when displacement of the conductive material 102 occurs in a manner indicated by the dashed lines 102". In either event, precise contactless sensing and control is readily implemented.

Figure 9A:
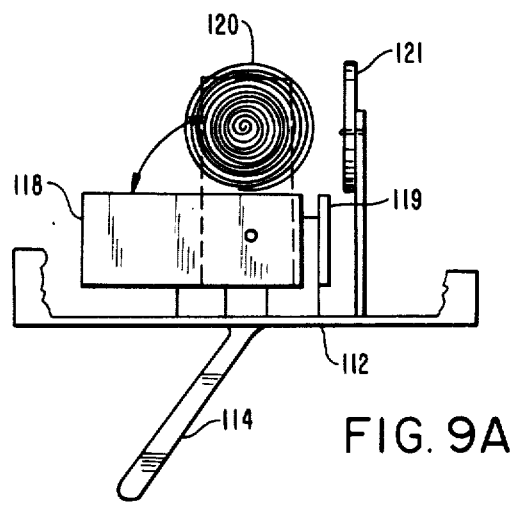
FIGS. 9A and 9B are front and top views, respectively, of a further sensor embodiment of the instant invention configured as a joy stick or X Y position sensing system.
Figure 9B:
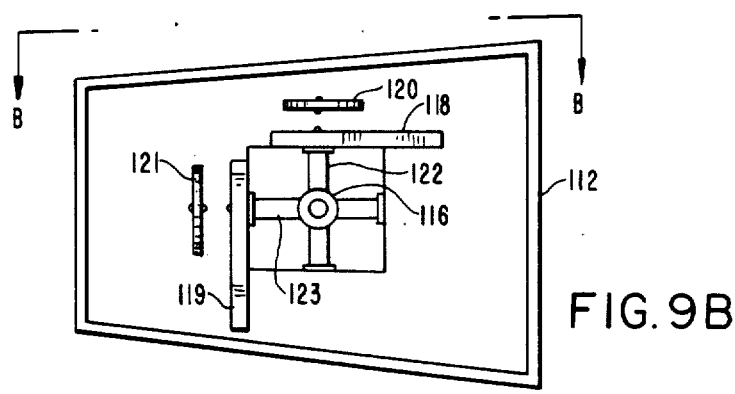

Referring now to FIGS. 9A and 9B, there are shown front and top views, respectively, of a further sensor embodiment of the instant invention configured as a joy stick or X and Y positioning system. The joy stick or X and Y positioning system illustrated in FIGS. 9A and 9B, shown inverted, comprises a platform 112, a handle 114, a component rotational assembly 116, a pair of spontaneous resonators 118 and 119 and a pair of printed circuit coils 120 and 121. The platform 112 may comprise any conventional form of mounting structure and, as such, may be an independent housing for the joy stick or a portion of a larger control assembly such as is employed in more complex forms of video gaming structure. The handle 114 is conventional and is adapted, as will be appreciated by those of ordinary skill in the art, for displacement by a user to define the location of an object or objects on a video screen. The handle 114 protrudes through the housing 112 and connects to the component rotational assembly 116 in a manner which is in all ways conventional.

The component rotational assembly 116 acts to separate the motion of the handle 114 into X and Y components and to provide such components in the form of discrete rotations of the shafts 122 and 123. The component rotational assembly 116 may take any of the conventional forms well known to those of ordinary skill in the art and it, per se, does not form a portion of the instant invention. One such conventional system is illustrated in FIGS. 3A and 3B of U.S. Pat. No. 4,142,180, as used on Feb. 27, 1979, and it will be appreciated that other systems for translating the motion of handle 114 into rotational displacements for the X and Y axes may be used as well.

Mounted to each of the shafts 122 and 123 are spontaneous resonators 118 and 119 which are illustrated in FIGS. 9A and 9B as wafers having a generally rectangular shape. The spontaneous resonators 118 and 119, shown as wafers, are mounted to each of the shafts 122 and 123, as shown in FIGS. 9A and 9B, in such manner that as the shafts 122 and 123 rotate as a function of the movement of the handle 114, the spontaneous resonators 118 and 119 are pivotably displaced so as to selectively cover and uncover portions of the faces of coils 120 and 121. Those of ordinary skill in the art will appreciate that any convenient form of mounting the coils 118 and 119 to the shafts 122 and 123 may be employed, and that to provide structural integrity, the thin layer of conductive material forming each of the spontaneous resonators 118 and 119 may be mounted on a plastic wafer or the like.

Further, while spontaneous resonators 118 and 119 are shown as having a generally rectangular shape, the face thereof, as best shown for coil 118 in FIG. 9A, may exhibit a curvalinear shape which may well resemble the cut on a cam to effect a linear output as the same increasingly covers or uncovers portions of the coil face. Such a curvalinear shape will result since the output of oscillators associated with coils 120 and 121 will vary as a function of the portion of the surface of the coil which is increasingly or decreasingly covered by a spontaneous resonator. Furthermore, those of ordinary skill in the art will also appreciate that while the spontaneous resonators 118 and 119 are shown as connected to shafts 122 and 123, operation could also be advantageously effected by placing spontaneous resonators completely over the faces of the coils 120 and 121. In this mode of operation, the oscillators associated with coils 118 and 119 are normally in a shut down condition. If this is done, thicker conductive material would be mounted in place of the spontaneous resonators 118 and 119 to selectively destroy the spontaneous resonance imposed on the coils 120 and 121 as a function of the position of the handle 114.

The coils 120 and 121 may take the form of the single layer printed circuit coils such as described in association with FIGS. 2A and 2B and are connected, as now will be appreciated by those of ordinary skill in the art, as the inductor within the tank of individual oscillator circuits associated therewith. The output of each of the individual oscillators associated with the coils 120 and 121 are applied to conventional means, well known to those of ordinary skill in the art, for controlling the position of an object on a video display.

In operation of the sensor embodiment illustrated in FIGS. 9A and 9B, it will be seen that as the handle 114 is rotated by an operator, the motion thereof will be translated into rotational components along shafts 122 and 123. As each of the shafts 122 and 123 is rotated, the coils 120 and 121 will be selectively covered and uncovered by the pivotable movement of the spontaneous resonators 118 and 119. As each of the spontaneous resonators 118 and 119 selectively cover a portion of its respective coil 120 and 121, the amplitude of the oscillations of the oscillator associated therewith will be reduced in an essentially linear manner from a condition where full magnitude oscillations are provided with the spontaneous resonator 118 in the position illustrated in FIG. 9A. The oscillator will provide a zero output when it is fully covered.

Those of ordinary skill in the art will appreciate that the positioning system illustrated in FIGS. 9A and 9B is highly advantageous as there is no mechanical interaction between the position defining spontaneous resonators 118 and 119 and the position sensing coils 120 and 121. This means that the response time of the system is essentially instantaneous, the handle 114 is freely displaceable without constraints, and the embodiment exhibits the freedom from dirt, dust and aging characteristics manifested by all switches, sensors and modulators configured according to the instant invention.

Referring now to FIG. 10, there is shown a block diagram serving to schematically illustrate another switch embodiment of the present invention configured as a keyboard or pad array. The keyboard or pad array illustrated in FIG. 10 comprises a plurality of keys, each formed by a key cap 130A–130C, a shaft 132A–132C disposed through a casing 134 and an activating member 136A–136C. Associated with each key is a spontaneous resonator 138A–138C disposed on a mounting member 140, as well as an associated single layer printed coil 146A–146C mounted on a housing 148. The mounting member 140 is mounted to the housing 148 by appropriate spacers 142 and 144. Each of the keys formed is biased in the position shown by a spring member 150A–150C, which may take the form of a conventional coil spring or the like.

The activating member 136A–136C may take the form of a thickened pad of conductive material; however, it will be readily appreciated that should it be desired to have the oscillators, not shown, utilized in this embodiment in a normally active position, the activating members 136A–136C may take the form of non-conductive members having spontaneous resonators mounted directly thereon. Such an embodiment would avoid the need for the spontaneous resonators 138A–138C, as well as the mounting member 140 therefor shown in FIG. 10. The activating members 136A–136C in their normal position will reside at least $\frac{1}{4}$ inch above the surface of the coils 138A–138C. However, a greater distance is available should the designer wish to provide longer shafts 132A–132C, and in this manner, the stroke of the key may be accommodated to a user's preference. Similarly, the force imposed by the bias means 150A–150C may be varied to provide suitable touch characteristics to each of the keys.

The spontaneous resonators 138A–138C may take the precise form described in connection with FIGS. 2A and 2B, however, a smaller diameter therefor is preferably employed to accommodate appropriate packing of the keyboard structure. Each of the spontaneous resonators 138A–138C is mounted on mounting member 140, which may be formed of plastic material or the like. While mounting member 140 is shown as spaced above coils 146A–146C by spacers 142 and 144, the same may be alternatively mounted directly thereon so that the actual face of the coils is employed for support purposes. Furthermore, as will be apparent to those of ordinary skill in the art, the entire structure formed by the spontaneous resonators 138A–138C, the support member 140, the coils 146A–146C and the housing 148 may be encapsulated. The spontaneous resonators 138A–138C are preferably mounted approximately $\frac{1}{4}$ inch above the surface of the coils 146A–146C so as to maintain the oscillators, not shown in FIG. 10, in a shut down condition absent a depression of one of the keys. However, should it be desired to have the oscillators in a normally active condition, the resonators 138A–138C may be directly mounted on insulating pads 136A–136C so that the structure associated with the mounting member 140 and the separate spontaneous resonators 138A–138C may be avoided.

Each of the coils 146A–146C may take the form described in connection with FIGS. 2A and 2B; however, the substantially smaller coil diameters are preferably employed to accommodate appropriate keyboard packing. Each of the coils 148A–148C is mounted to the housing 148 of the keyboard structure and an individual oscillator therefor, not shown, is provided wherein such oscillator may take any of the forms described in connection with FIGS. 2 and 3. As is apparent, the activating members 136A–136C, the spontaneous resonators 138A–138C and the coils 136A–136C for each key are spatially aligned so that when a key is in its normal position, the effect of the spontaneous resonator 138A–138C is to shut down the oscillator associated with coils 146A–146C. Whenever a key is depressed, the activating member 136A–136C associated with that key will be displaced in a downward position sufficiently close to that key's spontaneous resonator 138A–138C to destroy the spontaneous resonance characteristic thereof and cause the oscillator associated with that key to break out into oscillations to signal that the key has been depressed.

The keyboard or pad embodiment of the instant invention illustrated in FIG. 10 may have as many individual keys as desired to accommodate a particular application. In addition, the outputs of the individual oscillators employed for the coils 146A–146C may either be sampled directly to ascertain which key has been depressed, or alternatively, the frequencies associated with each oscillator may differ or be otherwise coded so that a determination of which key is depressed may be made directly. Again, the independence of the digital switching technique employed herein from ambient conditions is viewed as highly desirable as keyboards and key pads traditionally operate in difficult environments.

Referring now to FIG. 11, there is shown a block diagram serving to schematically illustrate an additional sensor embodiment of the present invention configuration as a thickness measuring device. The embodiment of the invention illustrated in FIG. 11 comprises a coil 150, a spontaneous resonator 152 and a displaceable platform member 154 upon which conductive materials 156, whose thickness is to be monitored or measured, are conveyed during processing. The coil 150 may take the form of single layer printed circuit coils described in connection with FIGS. 2A and 2B, and similarly, spontaneous resonator 152 may take any of the forms of this device heretofore described. Furthermore, the coil 150 and the spontaneous resonator 152 may be formed as a single unit and encapsulated. Additionally, while only a single coil and spontaneous resonator 152 have been illustrated in FIG. 11, it will be apparent to those of ordinary skill in the art that a linear array of these devices may be employed if the conductive material whose thickness is being tested is of substantial width. The coil 150 is again connected as the inductor in the resonant tank of an oscillator and this oscillator may be configured in the same manner as described in connection with FIG. 4. The spontaneous resonator 152 is disposed approximately ⅛ inch from the surface of the coil 150; however, this parameter may be modified in the manner described above to accommodate appropriate analog characteristics for the device.

The displaceable platform member 154 is configured to provide a translation path and effectively a set point for the conductive material 156 being processed. This set point is established so that the surface of the conductive material 156 closest to the spontaneous resonator 152 is approximately in the middle of the analog range of the oscillator. Thus, if the onset of the conductive material's effect on the spontaneous resonator 156 begins ⅜ inch from the surface of the spontaneous resonator 152 and causes maximum oscillation of the oscillator associated with the coil 150 when this surface is within ⅛ inch from the surface of the spontaneous resonator 152, displaceable platform 154 will be configured so this surface normally is ¼ inch from the surface of the spontaneous resonator 152 when the desired thickness of the conductive material 156 is present. Alternatively, if thickness measuring within a range, rather than thickness monitoring, is the principal function of the device being configured, then the displaceable platform 154 will be established at a displacement such that the conductive material 156 has its surface ⅜ inch away from spontaneous resonator 152 when minimum thickness within a given range is to be measured and ⅛ inch from the surface thereof for maximum thickness. The ¼ inch interval represents the full interval of displacement within a range selected. Of course, if a conductive material 156 is extremely thin so as to be capable of exhibiting spontaneous resonance, the spontaneous resonator 152 may be omitted and the thin layer of conductive material 156 positioned in place thereof in such a manner that its thickness will directly vary the output of the oscillator associated with coil 150.

In operation of the thickness measuring embodiment of the invention illustrated in FIG. 11, it will be appreciated that the output of the oscillator connected to the coil 150 will be at a defined midpoint when the conductive material 156 is at the desired thickness. When the conductive material 156 being processed becomes thinner than the desired range, the surface thereof closest to the spontaneous resonator 152 will be displaced therefrom by an amount which corresponds to the deviation in the thickness from the desired level. This will cause an attendant decrease in the output of the oscillator connected to the coil 150. Since this is occurring within the apparent linear analog range of the device, the same may be directly read out in terms of the reduction in thickness which is occurring and result in automatic adjustment of the processing being conducted. Conversely, when the thickness of the conductive material 156 being processed increases from that associated with the desired thickness, the surface thereof closest to the spontaneous resonator 152 moves closer to the face of the spontaneous resonator, increasingly destroying the ability thereof to exhibit its spontaneous resonance characteristic. Under these conditions, the oscillator associated with the coil 150 will increase in magnitude so that, in effect, the output of the oscillator within this substantially linear range may be directly calibrated in terms of thickness.

The thickness measuring embodiment of the instant invention illustrated in FIG. 11 provides a highly advantageous device since the same will act in a substantially linear manner to measure very small changes in thickness. It also will provide accurate measurements as to the thickness of conductive material being processed. Furthermore, in a second mode of operation where the conductive material being processed is utilized as the spontaneous resonator per se, the device is highly useful as techniques for measuring extremely thin layers of material in an accurate manner are not generally available.

Although the present invention has been disclosed in conjunction with a plurality of rather specific exemplary embodiments, it will be appreciated by those of ordinary skill in the art that the rather unique ability to sense the presence of a spontaneous resonator or to employ other conductive material to selectively destroy the characteristic of spontaneous resonance presents rather marked advantages when considered in conjunction with the field of sensing devices, switches and modulators. Furthermore, all this is achieved in a contactless environment and the sensing techniques employed are, for all practical purposes, free of environment factors. Furthermore, aging and reliability problems so common in optical techniques are completely avoided.

Those of ordinary skill in the art, upon a consideration of the instant specification, will readily appreciate that many alternatives to the specific embodiments set forth, as well as other applications therefor, are readily available. For instance, by placing a spontaneous resonator in a fixed location on a shaft or wheel, the same may be sensed in a contactless manner to readily provide an indication of the speed of the shaft such as is commonly achieved through tachometer devices and the like. Many other additional digital applications are also available. For instance, miniaturization of the spontaneous resonators and coils employed therefor will readily lead to the implemention of basic binary devices, as well as new forms of read-only memories.

While the invention has been described in connection with a plurality of preferred exemplary embodiments thereof, it will be understood that many modifications will be readily apparent to those of ordinary skill in the art; and that this specification is intended to cover any adaptation or variations thereof. Therefore, it is manifestly intended that this invention be only limited by the claims and the equivalents thereof.

What is claimed is:

1. Apparatus for detecting electrically conductive material comprising:
   a thin layer of conductive material capable of exhibiting spontaneous resonance wherein spontaneous resonance is defined as a characteristic enabling said thin layer to emulate a passive resonant circuit and absorb energy from an appropriately tuned oscillating circuit, said thin layer of conductive material defining a first surface and having a thickness which is less than the skin effect depth of said layer at a predetermined frequency; and
   oscillator means having a resonant tank circuit including capacitor means and coil means, said coil means having a plurality of turns defining a second surface substantially parallel to said first surface, said oscillator means having a frequency in relation to the thickness of said thin layer causing a marked reduction in the amplitude of oscillations of said oscillator means when said thin layer of conductive material is placed proximate to said coil in the absence of other conductive material.

2. The apparatus according to claim 1 wherein said plurality of turns of said coil means is formed as a single layer.

3. The apparatus according to claim 1 wherein said oscillator means takes the form of a Colpitts oscillator.

4. The apparatus according to claim 1 wherein said electrically conductive material detected is translated along a fixed path, said apparatus additionally comprising:
   means for mounting said coil means having a plurality of turns and said thin layer of conductive material in a spatially aligned position adjacent to said fixed path in such manner that when conductive material to be detected is present at a particular location in said fixed path, said coil means, said thin layer of conductive material and said conductive material to be detected are spatially aligned; and
   means for monitoring said oscillator means to determine if said conductive material to be detected is present.

5. The apparatus according to claim 4 wherein said oscillator means provides output oscillations of substantial magnitude only when conductive material to be detected is present.

6. The apparatus according to claim 5 wherein said means for monitoring includes counter means for counting each occurrence of output.

7. The apparatus according to claim 6 wherein said conductive material to be detected comprises coins and said fixed path comprises a coin chute.

8. The apparatus according to claim 5 wherein said conductive material to be detected comprises a conductive pad disposed for displacement to said particular location by key cap means connected thereto.

9. The apparatus according to claim 8 additionally comprising:
   shaft means interconnecting said key cap means to said conductive pad; and
   means for normally biasing said conductive pad away from said particular location.

10. The apparatus according to claim 4 wherein said coil means having a plurality of turns and said thin layer of conductive material are displaced from said fixed path by a distance such that when conductive material to be detected is at said particular location in said fixed path and has a predetermined normal thickness, said amplitude of oscillations of said oscillator means are of a predetermined magnitude.

11. The apparatus according to claim 10 wherein said monitoring means provides an indication of the magnitude of said amplitude of oscillations of said oscillator means.

12. The apparatus according to claim 1 wherein when conductive material to be detected is at said particular location in said fixed path and has a thickness less than said predetermined normal thickness, said amplitude of oscillations of said oscillator means will have a value less than said predetermined magnitude.

13. The apparatus according to claim 11 wherein when conductive material to be detected is at said particular location in said fixed path and has a thickness greater than said predetermined normal thickness, said amplitude of oscillations of said oscillator means will have a value greater than said predetermined magnitude.

14. The apparatus according to claim 12 wherein when conductive material to be detected is at said particular location in said fixed path and has a thickness greater than said predetermined normal thickness, said amplitude of oscillations of said oscillator means will have a value greater than said predetermined magnitude.

15. The apparatus according to claim 1 wherein said coil means takes the form of a printed circuit.

16. The apparatus according to claim 1 additionally comprising:
   a member having at least a displaceable portion; and
   means for mounting said thin layer of conductive material and said coil means to impart relative displacement therebetween in response to displacing of said displaceable portion.

17. The apparatus according to claim 16 wherein said means for mounting establishes a spacing between said thin layer of conductive material and said coil means corresponding to a first position where said thin layer of conductive material has a minor effect upon the amplitude of oscillations of said oscillator means and extends to a second position where said thin layer of conductive material is proximate to said coil means and markedly reduces said amplitude of oscillations of said oscillator means.

18. The apparatus according to claim 16 wherein said amplitude of oscillations of said oscillator means varies as a function of said relative displacement between said thin layer of conductive material and said coil means.

19. The apparatus according to claim 18 wherein said member comprises a drum head.

20. The apparatus according to claim 19 wherein said thin conductive layer is mounted upon said drum head.

21. The apparatus according to claim 18 wherein said member comprises a diaphram.

22. The apparatus according to claim 21 wherein said thin conductive layer is mounted upon said diaphram.

23. The apparatus according to claim 18 wherein said member comprises a pivotable segment arranged to displace in accordance with the rotation of a shaft.

24. The apparatus according to claim 23 wherein said thin conductive layer is mounted upon said pivotable segment.

25. The apparatus according to claim 18 wherein said member includes piston means, said means for mounting includes cylinder means having walls and having a conductive liquid and said piston means disposed therein, and said thin layer of conductive material comprises a portion of said conductive liquid disposed between said piston and said cylinder walls.

26. The apparatus according to claim 19 wherein said coil means comprises a single layer helical coil disposed about said cylinder walls.

27. Apparatus for sensing electrically conductive material comprising:
    a thin layer of conductive material capable of exhibiting spontaneous resonance and having a thickness which is less than the skin effect depth of said layer at a predetermined frequency wherein spontaneous resonance is defined as a characteristic enabling said thin layer to emulate a passive resonant circuit and absorb energy from an appropriately tuned oscillating circuit; and
    oscillator means having inductor means therein, said inductor means being disposed to induce a field within said layer of conductive material, said oscillator means having a frequency in relation to the thickness of said thin layer of conductive material to cause spontaneous resonance to occur when said thin layer of conductive material is adjacent to said inductor means and no other conductive material is adjacent to said thin layer of conductive material and to cause the effect of spontaneous resonance to be negated when other conductive material is adjacent to said thin layer of conductive material.

28. The apparatus according to claim 27 wherein said inductor means takes the form of a planar printed circuit coil.

29. The apparatus according to claim 27 wherein said inductor means takes the form of a coil having a plurality of turns formed in a single layer.

30. The apparatus according to claim 27 wherein said oscillator means takes the form of a Colpitts oscillator.

31. The apparatus according to claim 27 wherein said electrically conductive material sensed is translated along a fixed path, said apparatus additionally comprising:
    means for mounting said inductor means and said thin layer of conductive material in a spatially aligned position adjacent to said fixed path in such manner that when conductive material to be sensed is present at a particular location in said fixed path, said inductor means, said thin layer of conductive material and said conductive material to be sensed are spatially aligned; and
    means for monitoring said oscillator means to determine if said conductive material to be sensed is present.

32. The apparatus according to claim 31 wherein said oscillator means provides output oscillations of substantial magnitude only when conductive material is present and said means for monitoring includes counter means for counting each occurrence of output oscillations of substantial magnitude.

33. The apparatus according to claim 31 wherein said conductive material to be detected comprises a conductive pad disposed for displacement to said particular location by key cap means connected thereto.

34. The apparatus according to claim 31 wherein said inductor means and said thin layer of conductive material are displaced from said fixed path by a distance such that when conductive material to be sensed is at said particular location in said fixed path and has a predetermined normal thickness, said amplitude of oscillations of said oscillator means is of a predetermined magnitude.

35. The apparatus according to claim 31 additionally comprising:
    a member having at least a displaceable portion; and
    means for mounting one of said thin layer of conductive material and said inductor means on said member and another of said thin layer of conductive material and said inductor means in a fixed position relative to said displaceable portion.

36. Apparatus for sensing electrically conductive material comprising:
    a thin layer of conductive material capable of exhibiting spontaneous resonance and having a thickness which is less than the skin effect depth of said layer at a predetermined frequency wherein spontaneous resonance is defined as a characteristic enabling said thin layer to emulate a passive resonant circuit and absorb energy from an appropriately tuned oscillating circuit; and
    oscillator means having coil means therein, said coil means being disposed to induce a charge pattern corresponding substantially to a mirror image of said coil means in said thin layer of conductive material, said oscillator means having a frequency in relation to the thickness of said thin layer of conductive material to cause said mirror image to be induced and to cause spontaneous resonance to occur when said thin layer of conductive material is adjacent to said coil means and no other conductive material is adjacent to said thin layer of conductive material and to cause spontaneous resonance to be inhibited when other conductive material is in proximity to said thin layer of conductive material.

37. The apparatus according to claim 36 wheren said coil means takes the form of a planar printed circuit coil.

38. The apparatus according to claim 36 wherein said coil means comprises a winding having a plurality of turns, said winding being formed as a single layer.

39. The apparatus according to claim 36 wherein said electrically conductive material sensed is translated along a fixed path, said apparatus additionally comprising:

means for mounting said coil means and said thin layer of conductive material in an aligned position adjacent to said fixed path in a manner such that when conductive material to be sensed is present at a particular location in said fixed path, said coil means, said thin layer of conductive material and said conductive material to be sensed are aligned; and means for monitoring said oscillator means to determine if conductive material to be sensed is present.

40. The apparatus according to claim 39 wherein said oscillator means provides output oscillations of substantial magnitude only when coductive material is present and said means for monitoring includes counter means for counting each occurrence of output oscillations of substantial magnitude.

41. The apparatus according to claim 39 wherein said conductive material to be detected comprises a conductive pad disposed for displacement to said particular location by key cap means connected thereto.

42. The apparatus according to claim 39 wherein coil means and said thin layer of conductive material are displaced from said fixed path by a distance such that when conductive material to be detected is at said particular location in said fixed path and has a predetermined normal thickness, said amplitude of oscillations of said oscillator means is of a predetermined magnitude.

43. The apparatus according to claim 39 additionally comprising:
 a member having at least a displaceable portion; and
 means for mounting one of said thin layer of conductive material and said inductor means on said member and another of said thin layer of conductive material and said inductor means in a fixed position relative to said displaceable portion.

44. Apparatus for sensing electrically conductive material comprising:
 a thin layer of conductive material capable of exhibiting spontaneous resonance and having a thickness which is less than the skin effect depth of said layer at a predetermined frequency wherein spontaneous resonance is defined as a characteristic enabling said thin layer to emulate a passive resonant circuit and absorb energy from an appropriately tuned oscillating circuit; and
 oscillator means having a resonant circuit including inductor means, said inductor means taking the form of a coil formed as a single layer defining a surface, said oscillator means having a resonant frequency selected in relation to the thickness of said thin layer for causing spontaneous resonance to occur when said thin layer is disposed proximate to said coil.

45. The apparatus according to claim 44 wherein said oscillator means takes the form of a Colpitts oscillator.

46. The apparatus according to claim 44 wherein said coil takes the form of a planar printed circuit.

47. The apparatus according to claim 44 wherein said electrically conductive material sensed is translated along a fixed path, said apparatus additionally comprising:
 means for mounting said coil means and said thin layer of conductive material in an aligned position adjacent to said fixed path in a manner such that when conductive material to be sensed is present at a particular position in said fixed path, said coil means, said thin layer of conductive material and said conductive material to be sensed are aligned; and
 means for monitoring said oscillator means to determine if conductive material to be sensed is present.

48. The apparatus according to claim 47 wherein said oscillator means provides output oscillations of substantial magnitude only when conductive material is present and said means for monitoring includes counter means for counting each occurrence of output oscillations of substantial magnitude.

49. The apparatus according to claim 47 wherein said conductive material to be detected comprises a conductive pad disposed for displacement to said particular location by key cap means connected thereto.

50. The apparatus according to claim 47 wherein coil means and said thin layer of conductive material are displaced from said fixed path by a distance such that when conductive material to be detected is at said particular location in said fixed path and has a predetermined normal thickness, said amplitude of oscillations of said oscillator means is of a predetermined magnitude.

51. The apparatus according to claim 47 additionally comprising:
 a member having at least a displaceable portion; and
 means for mounting one of said thin layer of conductive material and said inductor means on said member and another of said thin layer of conductive material and said inductor means in a fixed position relative to said displaceable portion.

52. Apparatus for detecting electrically conductive material comprising:
 a thin layer of conductive material capable of exhibiting spontaneous resonance and having a thickness which is less than the skin effect depth of said layer at a predetermined frequency wherein spontaneous resonance is defined as a characteristic enabling said thin layer to emulate a passive resonant circuit and absorb energy from an appropriately tuned oscillating circuit; and
 oscillator means having a resonant circuit including coil means, said coil means defining a surface, said surface defined by said coil means being disposed proximate to and substantially parallel with said thin layer of conductive material, said oscillator means having a resonant frequency selected in relation to the thickness of said thin layer to cause the magnitude of oscillations produced by said oscillator means to be markedly reduced in the absence of other conductive material adjacent to said thin layer of conductive material and to be of substantially full magnitude when other conductive material is adjacent to said thin layer of conductive material.

53. The apparatus according to claim 52 wherein said coil means is formed as a single layer.

54. A method of sensing electrically conductive material comprising the steps of:
 disposing a thin layer of electrically conductive material having a thickness which is less than the skin effect depth of said layer at a predetermined frequency in the field of an inductive coil of an oscillator;
 operating said oscillator at a frequency in relation to the thickness of said thin layer of electrically conductive material to cause said inductive coil to establish an induced tuned circuit in said thin layer of electrically conductive material and to establish therewith an associated induced lectromagnetic field; and monitoring the presence of said induced tune circuit in said thin layer of electrically conductive material to determine the presence of electrically conductive material in said area.

55. Apparatus for detecting electrically conductive material comprising:

a thin layer of conductive material having a thickness which is less than the skin effect depth of said layer at a predetermined frequency; and oscillator means having a resonant circuit including coil means, said coil means defining a surface, said surface defined by said coil means being disposed proximate to said thin layer of conductive material, said oscillator means having a resonant frequency selected in relation to the thickness of said thin layer to cause the magnitude of oscillations produced by said oscillator means to be markedly reduced in the absence of other conductive material adjacent to said thin layer of conductive material and to be of substantially full magnitude when other conductive material is adjacent to said thin layer of conductive material.

56. The apparatus according to claim 55 wherein said surface defined by said coil means is additionally disposed substantially in parallel with said thin layer of conductive material.

57. The apparatus according to claim 55 wherein said coil means takes the form of a planar printed circuit.

58. A method of sensing electrically conductive material comprising the steps of:

selecting a thin layer of conductive material capable of exhibiting spontaneous resonance and having a thickness which is less than the skin effect depth of said layer at a predetermined frequency wherein spontaneous resonance is defined as a characteristic enabling said thin layer to emulate a passive resonant circuit and absorb energy from an appropriately tuned oscillating circuit;

employing a coil having a plurality of turns forming a surface in a resonant tank circuit of an oscillator; and operating said oscillator at a frequency in relation to the thickness of said thin layer to cause spontaneous resonance to occur when said thin layer of conductive material is proximate to and substantially parallel with said surface formed by said plurality of turns and no other conductive material is adjacent to said thin layer of conductive material.

59. A method of sensing electrically conductive material comprising the steps of:

disposing a thin layer of conductive material adjacent to a path of translation of electrically conductive material to be sensed, said thin layer of conductive material forming a first surface substantially parallel to said path of translation and having a thickness which is less than the skin effect depth of said layer at a predetermined frequency;

placing a coil having a plurality of turns forming a second surface proximate to said thin layer of conductive material in such manner that said first and second surfaces are substantially parallel and each of said plurality of turns in said coil is equidistant from said first surface; and connecting said coil in the tank circuit of an oscillator having a frequency which in relation to the thickness of said thin layer of conductive material will cause a marked reduction in the magnitude of oscillations produced by said oscillator in the absence of other conductive material adjacent to said thin layer of conductive material and to be of substantially full magnitude when other conductive material is adjacent to said thin layer of conductive material.

60. A method of sensing electrically conductive material comprising the steps of:

selecting a thin layer of conductive material capable of forming a charge pattern corresponding substantially to a mirror image of a coil therein, said thin layer having a thickness which is less than the skin effect depth of said layer at a predetermined frequency;

connecting a coil having a plurality of turns formed as a surface in the tank circuit of an oscillator having a frequency which in relation to the thickness of said thin layer of conductive material will inhibit electron flow between charge pattern images formed in said thin layer of conductive material;

placing said thin layer of conductive material proximate to and in parallel with said surface formed by said coil; and monitoring the operation of said oscillator to determine the presence of electrically conductive material.

61. A method of detecting electrically conductive material comprising the steps of:

disposing a thin layer of conductive material capable of exhibiting spontaneous resonance adjacent to a path of translation of electrically conductive material to be sensed wherein spontaneous resonance is defined as a characteristic enabling said thin layer to emulate a passive resonant circuit and absorb energy from an appropriately tuned oscillating circuit, said thin layer of conductive material forming a first surface substantially parallel to said path of translation and having a thickness which is less than the skin effect depth of said layer at a predetermined frequency;

placing a coil having a plurality of turns forming a second surface proximate to said thin layer of conductive material in such manner that said first and second surfaces are substantially parallel and each of said plurality of turns in said coil is equidistant from said first surface; and connecting said coil in the tank circuit of an oscillator having a frequency which in relation to the thickness of said thin layer of conductive material will cause spontaneous resonance to occur in said thin layer of conductive material in the absence of electrically conductive material to be sensed.

62. Apparatus for sensing electrically conductive material comprising:

a plurality of thin layers of electrically conductive material disposed about a path to be translated by electrically conductive material to be sensed, each of said plurality of thin layers having a thickness which is less than the skin effect depth of said layers at a predetermined frequency;

a plurality of coil means, each coil means defining a surface and being associated with and disposed substantially in parallel to a particular one of said plurality of thin layers of electrically conductive material such that each of said plurality of thin layers of electrically conductive material has one of said plurality of coil means associated therewith;

a plurality of oscillator means, each of said plurality of oscillator means having a resonant circuit including one of said plurality of coil means, each of said plurality of oscillator means having a resonant frequency selected in relation to the thickness of a thin layer of conductive material associated with said one of said plurality of coil means in the resonant circuit thereof; and means for monitoring said plurality of oscillator means for sensing electrically conductive material.

* * * * *

UNITED STATES PATENT AND TRADEMARK OFFICE
CERTIFICATE OF CORRECTION

PATENT NO. : 4,678,994

DATED : July 7, 1987

INVENTOR(S) : Ronald C. Davies

It is certified that error appears in the above-identified patent and that said Letters Patent is hereby corrected as shown below:

Column 5, line 62, "uitlized" should read --utilized--.
Column 10, line 7, "10" should read --1--.
Column 20, line 22, "wals", should read --walls--.
Column 22, line 50, "used" should read --issued.
Column 25, lines 26-27, "configuration" should read
   --configured--.
Column 28, line 32, "1" should read --11--.
Column 33, line 1, "lectromagnetic" should read
   --electromagnetic--.

Signed and Sealed this

Fourteenth Day of June, 1988

Attest:

DONALD J. QUIGG

*Attesting Officer*      *Commissioner of Patents and Trademarks*